US007772954B2

(12) United States Patent
Huang et al.

(10) Patent No.: US 7,772,954 B2
(45) Date of Patent: Aug. 10, 2010

(54) SYMMETRICAL AUTO TRANSFORMER WYE TOPOLOGIES

(75) Inventors: Jian Huang, Everett, WA (US); Jeffrey J. White, Shoreline, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 12/336,467

(22) Filed: Dec. 16, 2008

(65) Prior Publication Data

US 2010/0148900 A1 Jun. 17, 2010

(51) Int. Cl.
*H01F 30/12* (2006.01)
*H02M 7/06* (2006.01)

(52) U.S. Cl. .......... 336/5; 336/12

(58) Field of Classification Search .......... 336/5, 336/12

See application file for complete search history.

(56) References Cited

U.S. PATENT DOCUMENTS 4,779,181 A 10/1988 Traver et al.
5,093,614 A * 3/1992 Woodworth .......... 323/361
5,148,357 A * 9/1992 Paice .......... 363/5
5,455,759 A * 10/1995 Paice .......... 363/126
5,619,407 A 4/1997 Hammond
5,781,428 A 7/1998 Paice
6,101,113 A 8/2000 Paice
6,498,736 B1 * 12/2002 Kamath .......... 363/44
6,995,993 B2 * 2/2006 Sarlioglu et al. .......... 363/44
7,095,636 B2 * 8/2006 Sarlioglu .......... 363/39
7,207,521 B2 4/2007 Atkey et al.
7,210,653 B2 5/2007 Atkey et al.
2007/0267540 A1 11/2007 Atkey et al.
2007/0284480 A1 12/2007 Atkey et al.

OTHER PUBLICATIONS

Furmanczyk et al,, "Demonstration of Very High Power Airborne AC to DC Converter", in proceed, SAE international power System Conference, Nov. 2004.

Kamath et al., "A Novel Autotransformer based 18-pulse Rectifier Circuit", in Proceed. IEEE APEC'02, vol. 2, pp. 795-801, Mar. 2002.

Kamath et al., "A Compact Autotransformer based 12-pulse Rectifier Circuit", in Proceed. IEEE IECON'01, vol, 2, pp. 1344-1349, Nov. 2001.

* cited by examiner

*Primary Examiner*—Anh T Mai
(74) *Attorney, Agent, or Firm*—Yee & Associates, P.C.; Kevin G. Fields

(57) ABSTRACT

Various embodiments of multi-phase transformers are disclosed. For example, a transformer includes primary windings, secondary windings and third windings. Primary windings, secondary windings and third windings may include sub windings coupled to form junctions. Primary windings are coupled at ends to form a delta configuration. Secondary windings are coupled to primary windings. Third windings are coupled to primary windings and secondary windings. Secondary windings and the third windings may be magnetically coupled to primary windings. The outputs at second ends of third windings are greater than the outputs at the second ends of secondary windings. In some embodiments, the outputs at adjacent second ends of the third windings are substantially equal. In other embodiments, a phase angle difference of outputs at adjacent second ends of third windings is substantially equal. In some embodiments, the phase angle difference of outputs at adjacent second ends of secondary windings is substantially equal.

41 Claims, 29 Drawing Sheets

1130

SYMMETRICAL AUTO TRANSFORMER WYE TOPOLOGIES

CROSS REFERENCE TO RELATED APPLICATIONS

This application is related to U.S. patent application Ser. No. 12/336,457, entitled "SYMMETRICAL AUTO TRANSFORMER DELTA TOPOLOGIES", filed on even date herewith, the disclosure of which is incorporated herein by reference in its entirety.

BACKGROUND

1. Field of the Disclosure

This disclosure is directed to transformers.

2. Related Art

In many applications, for example, shipboard and aircraft applications, a high voltage direct current (DC) power is used to power motor controllers. Typically, a three phase alternating current (AC) voltage of 230 Volts (root mean square (rms)) is generated in a ship or an aircraft and the generated AC voltage is applied to an auto transformer rectifier unit (ATRU). The ATRU generates a DC voltage of +/− 270 Volts. The DC voltage from the ATRU is used to power motor controllers.

The voltage output of the motor controllers is limited by the rectified DC voltage of the ATRU. It is desirable to increase the voltage output of the motor controllers.

In order to increase the voltage output of the motor controllers, various approaches have been tied. One approach is to generate a higher input AC voltage from the generator. This approach has shortcomings because by increasing the generator output AC voltage, the insulation level of the ship or aircraft has to be increased. Furthermore, increased input AC voltage leads to additional challenges like corona, high voltage spikes and component breakdown.

Another approach has been to add a step-up (or step up) autotransformer before the motor controller to get a higher rectified, output DC voltage or after the motor controller to get a higher output AC voltage. Adding an additional step-up transformer before or after the motor controller adds additional heavy components to the overall power generation system. This increases overall weight of the system and is undesirable in environments that may be sensitive to weight, for example, ships and aircrafts.

Continuous efforts are being made to deal with the foregoing issues.

SUMMARY OF THE DISCLOSURE

In one embodiment, a multi-phase transformer is disclosed. The multi-phase transformer includes a first group of windings, a second group of windings and a third group of windings. The first group of windings includes a plurality of primary windings with a first end and a second end. The first end of each of the primary windings is coupled at a common junction to form a wye configuration. Each of the primary windings are configured to receive one phase of a multi-phase input voltage at the second ends of the primary windings.

The second group of windings include a plurality of secondary windings with each secondary winding having a first end and a second end. Each secondary winding may be magnetically coupled to a primary winding.

The third group of windings includes a plurality of third windings. Each third winding includes a first end and a second end. Each third winding may be magnetically coupled to a primary winding such that an output voltage at the second end of the third windings is higher than an output voltage at the second end of the secondary windings and the second end of the primary windings.

In another embodiment, another multi-phase transformer is disclosed. The multi-phase transformer includes a first group of windings, second group of windings and third group of windings. The first group of windings includes a plurality of primary windings, with each primary winding having a first end and a second end. Each primary winding includes one or more sub primary windings that may be coupled in series with a junction of two sub primary windings defining an interior junction. The first end of each of the primary windings is coupled at a common junction to form a wye configuration. Each primary winding is configured to receive one phase of a multi-phase input voltage at the second end.

The second group of windings includes a plurality of secondary windings with each secondary winding having a first end and a second end. Each secondary winding may be magnetically coupled to a primary winding.

The third group of windings includes a plurality of third windings with each third winding having a first end and a second end. Each third winding may be magnetically coupled to a primary winding. The third group of windings is configured with respect to the first group of windings and the second group of windings such that an output voltage at the second end of the third windings is higher than an output voltage at the second end of the secondary windings and the primary windings.

In some embodiments, some of the secondary windings include a plurality of sub-windings. In other embodiments, some of the third windings include a plurality of sub-windings.

This brief summary has been provided so that the nature of the disclosure may be understood quickly. A more complete understanding of the disclosure may be obtained by reference to the following detailed description of embodiments, thereof in connection with the attached drawings.

BRIEF DESCRIPTION OF THE DRAWINGS

The foregoing features and other features of the present disclosure will now be described with respect to the drawings. In the drawings, the same components have the same reference numerals. The illustrated embodiment is intended to illustrate, but not to limit the disclosure. The drawings include the following figures.

DETAILED DESCRIPTION

Definitions

The following definitions are provided for convenience, as they are used in describing various embodiments of this disclosure.

"First group of windings" means a collection of a plurality of primary windings.

"Second group of windings" means a collection of a plurality of secondary windings.

"Third group of windings" means a collection of a plurality of third windings.

"Primary winding" is a winding that may have a winding or a plurality of sub windings. Primary windings have two ends. Primary windings may have one or more sub primary windings coupled together. In some embodiments, the sub windings of a primary winding may be coupled in series at one end to form a sub-junction.

"Interior junction" means a junction of two sub primary windings of a primary winding.

"Common junction" means a junction of two or more primary windings coupled together at one of their ends. Three primary windings may be coupled at one of their ends to form a WYE winding configuration.

"Secondary winding" is a winding that may have a winding or a plurality of sub-windings. Secondary windings have at least a first end and a second end. In some embodiments, the sub-windings may be coupled together to form a sub-junction. Secondary windings may be magnetically coupled to a primary winding. Sub-windings of secondary winding may be magnetically coupled to the same primary winding or a different primary winding.

"Sub-junction" means a junction created by a plurality of sub-windings. In some embodiments, two sub-windings may be coupled in series. In other embodiments, three sub-windings may be coupled at one end to form a WYE configuration.

"Third winding" means a winding that may have a winding or a plurality of sub-windings. A third winding may have at least a first end and a second end. A third winding may be magnetically coupled to a primary winding. Sub-windings of a third winding may be magnetically coupled to the same primary winding or a different primary winding.

To facilitate an understanding of the preferred embodiment, the general architecture of an auto-transformer rectifier system with an exemplary auto-transformer will be described. The specific architecture of various alternate embodiments of auto-transformers will then be described with respect to the general architecture.

Figure 1A:
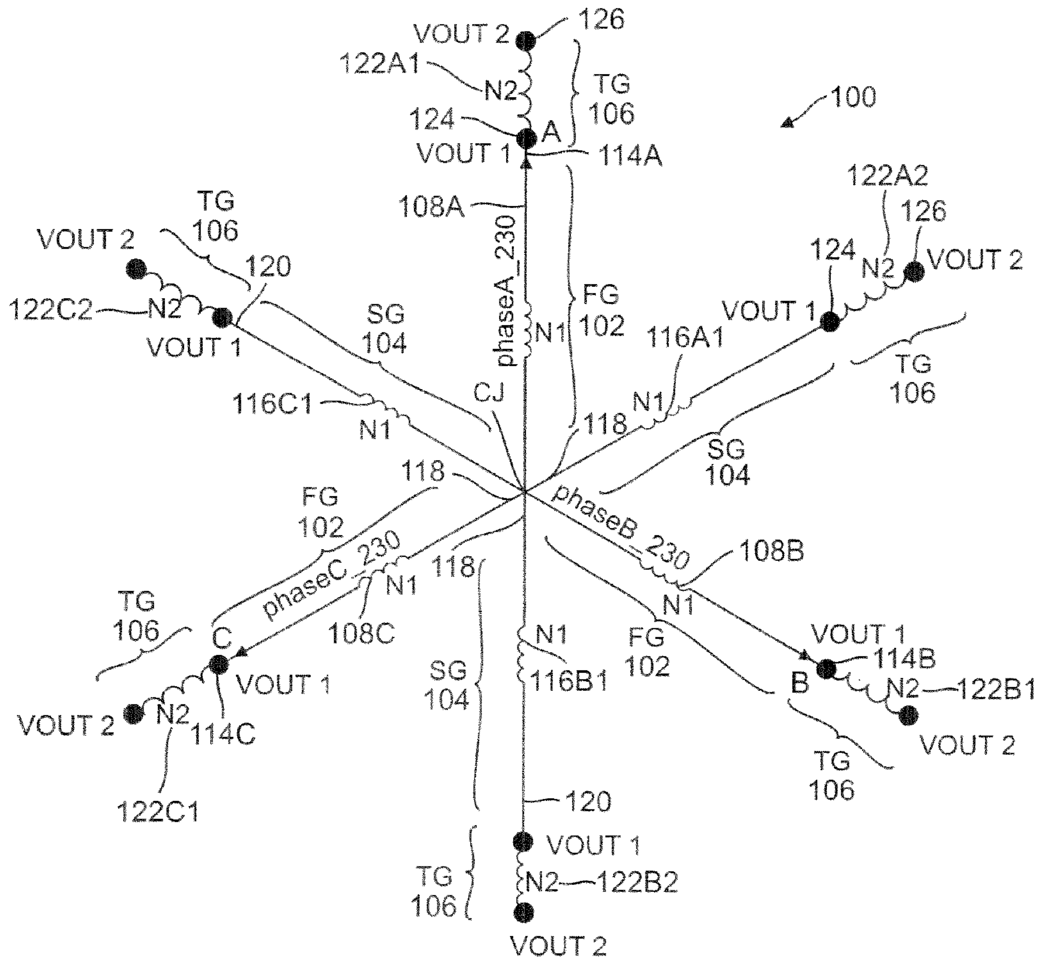
FIG. 1A is a winding diagram of a multi-phase auto-transformer.
Figure 1B:
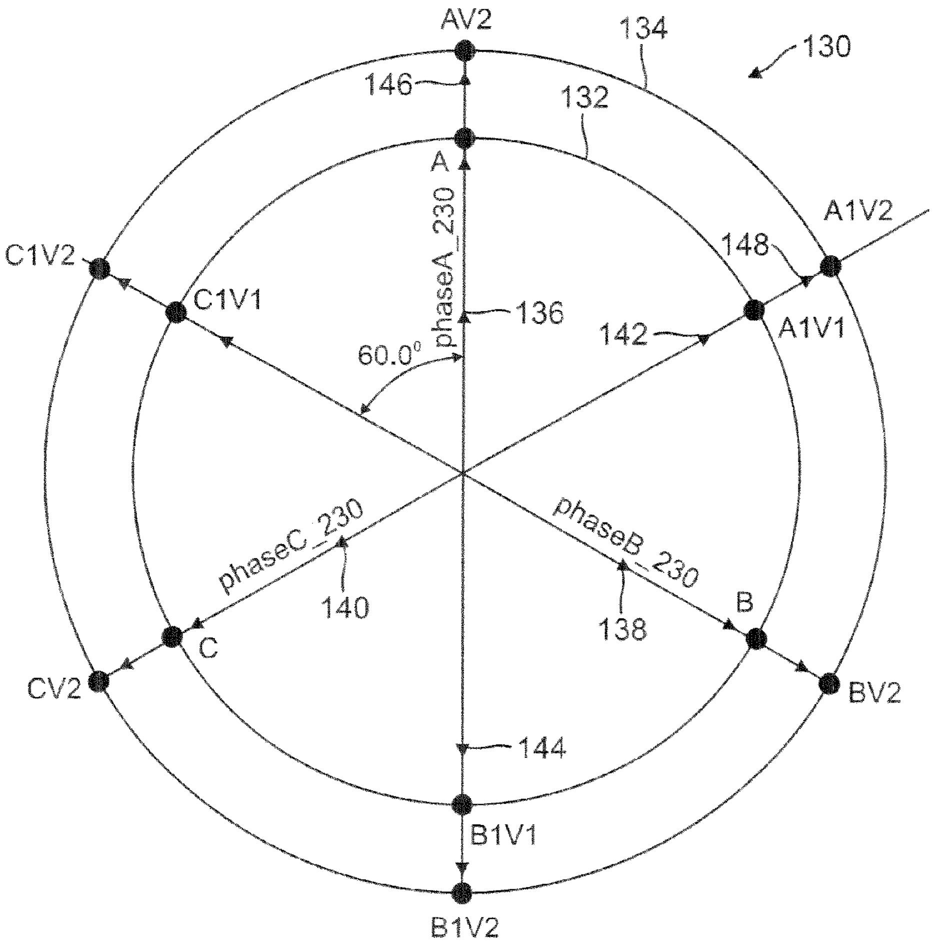
FIG. 1B is a phasor diagram for the multi-phase auto-transformer of FIG. 1A.

A multi-phase transformer 100 is described with respect to FIGS. 1A and 1B. FIG. 1A is a winding diagram for multi-phase transformer 100. FIG. 1B is a phasor diagram for multi-phase transformer 100. Transformer 100 is an example of a six phase or twelve pulse multi-phase transformer.

Referring to FIG. 1A, the transformer 100 may include a first group of windings 102, a second group of windings 104 and a third group of windings 106. The first group of windings 102 may include a plurality of primary windings 108A-108C.

One end of the primary windings is coupled together at a common junction CJ to form a WYE configuration. The second end of each primary winding is configured to receive one phase of a multi-phase input voltage. For example primary winding 108A receives one phase of a multi-phase input voltage at second end 114A. Similarly, primary winding 108B receives another phase of a multi-phase input voltage at second junction 114B. Primary winding 108C receives yet another phase of a multi-phase input voltage at second junction 114C.

The second group of windings 104 may include a plurality of secondary windings, for example, secondary windings 116A1-116C1. Each secondary winding 116A1-116C1 includes a first end 118 and a second end 120. Each secondary winding 116A1-116C1 may be magnetically coupled to one of the primary windings 108A-108C.

The third group of windings 106 may include a plurality of third windings. For example, third windings 122A1, 122A2, 112B1, 122B2, 122C1 and 112C2. Each third winding 122A1-122C2 may include a first end 124 and a second end 126. Each third winding 122A1-122C2 may be magnetically coupled to one of the primary windings 108A-108C.

In one embodiment, the first end 118 of each secondary winding 116A1-116C1 may be coupled to the common junction CJ.

In one embodiment, the first end 124 of each third winding 122A1-122C2 may be coupled either to a secondary winding 116A1-116C2 or to a primary winding 108A-108C. The third group of windings 106 may be configured with respect to the first group of windings 102 and the second group of windings 104 such that an output voltage Vout2 at the second end 126 of the third windings 122A1-122C2 is higher than an output voltage Vout1 at the second end 120 of the secondary windings 116A1-116C2 and the second end 114A-114C of the primary windings 108A-108C.

In one embodiment, a phase angle difference of the output voltage Vout2 at two adjacent second ends of third windings is substantially the same. For example, the phase angle difference of the output voltage Vout2 at second end 126 of two adjacent third windings 122A1-122A2, 122A2-122B1, 122B1-122B2, 122B2-122C1, 122C1-122C2 and 122C2-122A1 is substantially the same.

In one embodiment, the output voltage Vout2 at the second end of the third windings is substantially equal. For example, the output voltage Vout2 at the second end 126 of the thud windings 122A1-122C2 is substantially the same.

In one embodiment, the output voltage Vout1 at the second end of secondary windings 116 and at the second end of the primary windings 108 is substantially equal. For example, the output voltage Vout1 at the second end 120 of secondary windings 116A1-116C2 and at the second end 114A-114C of primary windings 108A-108C is substantially equal.

In one embodiment, the output voltage Vout2 is greater than output voltage Vout1.

FIG. 1A also shows an example of the number of turns for various windings and sub windings. Some of the windings having substantially the same number of turns. For example, the primary windings 108A, 108B and 108C may have substantially the same number of turns N1. Similarly, the secondary windings 116A1, 116B1 and 116C1 may have substantially the same number of turns N1. Further, the third windings 122A1-122C2 may have substantially the same number of turns N2.

Now referring to FIG. 1B, an example of a phasor diagram 130 for the multi-phase transformer 100 of FIG. 1A is disclosed. As one skilled in the art appreciates, the phasor diagram graphically depicts various aspects of the multi-phase transformer. For example, the phasor diagram depicts the relationship between the first group of windings, second group of windings and the third group of windings. More specifically, various windings are represented by lines in a phasor diagram and the length of a line represents the number of turns of the winding. The lines in a phasor diagrams are vector lines depicting a vector of the induced voltage. Two vector lines that are parallel to each other represent magnetic coupling between corresponding two windings. The radial length of each segment between two junctions along the circumference represents the phase angle difference between the output signals at those junctions, with the full circle representing 360 degrees. The common center of the circle represents the effective electrical neutral position.

The phasor diagram 130 may include a first circle 132 and a second circle 134, both having a common center S. In one embodiment, the common center S corresponds to the common junction CJ of transformer 100. The sides SA, SB and SC represent the primary windings 108A-108C, respectively.

Points A1V1, B1V1 and C1V1 represent the second end 120 the secondary windings 116A1, 116B1 and 116C1 respectively. Similarly, points A1V2, B1V2 and C1V2 represent second end 126 of third windings 122A1, 122B1 and 122C1 respectively.

For example, lines S-A1V1, S-B1V1 and S-C1V1 represent the secondary windings 116A1, 116B1 and 116C1 respectively. Lines A-AV2, A1V1-A1V2, B-BV2, B1V1-B1V2, C-CV2 and C1V1-C1V2 represent the third windings 122A1, 122A2, 122B1, 122B2, 122C1 and 122C2 respectively.

The length of the lines S-A, S-B and S-C represent the number of turns N1 for the primary windings 108A, 108B and 108C. Length of the lines S-A1V1, S-B1V1 and S-C1V1 represent the number of turns N1 for the secondary windings 116A1, 116B1 and 116C1, respectively. The length of the lines A-AV2, A1V1-A1V2, B-BV2, B1V1-B1V2, C-CV2 and C1V1-C1V2 represent the number of turns N2 for the third windings 122A1-122C2, respectively.

In summary, points A, B and C in the phasor diagram represent the second end 114A-114C of the primary windings, points A1V1, B1V1 and C1V1 represent the second end 120 of the secondary windings 116A1-116C1 and points AV2, A1V2, BV2, B1V2, CV2 and C1V2 represent the second end 126 of the third windings 122A1-122C1 respectively.

The lines SA, SB and SC represent an input AC voltage Vin applied to the second ends A, B and C of the primary windings. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting a vector of the induced voltage. For example, the vector of the induced voltage in primary windings SA, SB and SC are depicted by the arrows 136, 138 and 140. Similarly, the arrows on lines representing the secondary windings and the third windings represent the vector of the induced voltage. For example, arrows 142 and 144 represent the vector of the induced voltage in secondary winding 116A1 and 116B1 respectively. The arrows 146 and 148 represent the vector of the induced voltage in the third windings 122A1 and 122A2, respectively.

In one embodiment, a vector of the induced voltage in the secondary windings is such that they are about 180 degrees out of phase with the vector of the induced voltage in a primary winding to which they may be magnetically coupled. In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that they are in phase or about 180 degrees out of phase with the vector of the induced voltage in a primary winding to which they may be magnetically coupled. In one embodiment, the vector of the induced voltage in the third windings is such that the phase angle difference of the output voltage at two adjacent second ends of the third windings is substantially the same.

The phasor diagram 130 shows an example of a vector of the induced voltage in the primary windings, secondary windings and the third windings.

For example, in one embodiment, the vector of the induced voltage in each of the secondary windings is about 180 degrees out of phase with the vector of the induced voltage in the primary winding. For example, the vector of the induced voltage in the secondary winding 116A1 depicted by line S-A1V1 is about 180 degrees out of phase with the vector of the induced voltage in the primary winding 108C depicted by line SC.

In one embodiment, a vector of the induced voltage in a third winding coupled to a secondary winding is in phase with the vector of the corresponding secondary winding. Further, the vector of the induced voltage in a third winding coupled to a primary winding is in phase with the vector of the induced voltage of that primary winding. For example, the vector of the induced voltage in the third winding 122A1 depicted by line A-AV2 and coupled to primary winding 108A depicted by line S-A is in phase with the vector of the induced voltage in the primary winding 108A.

Figure 2:
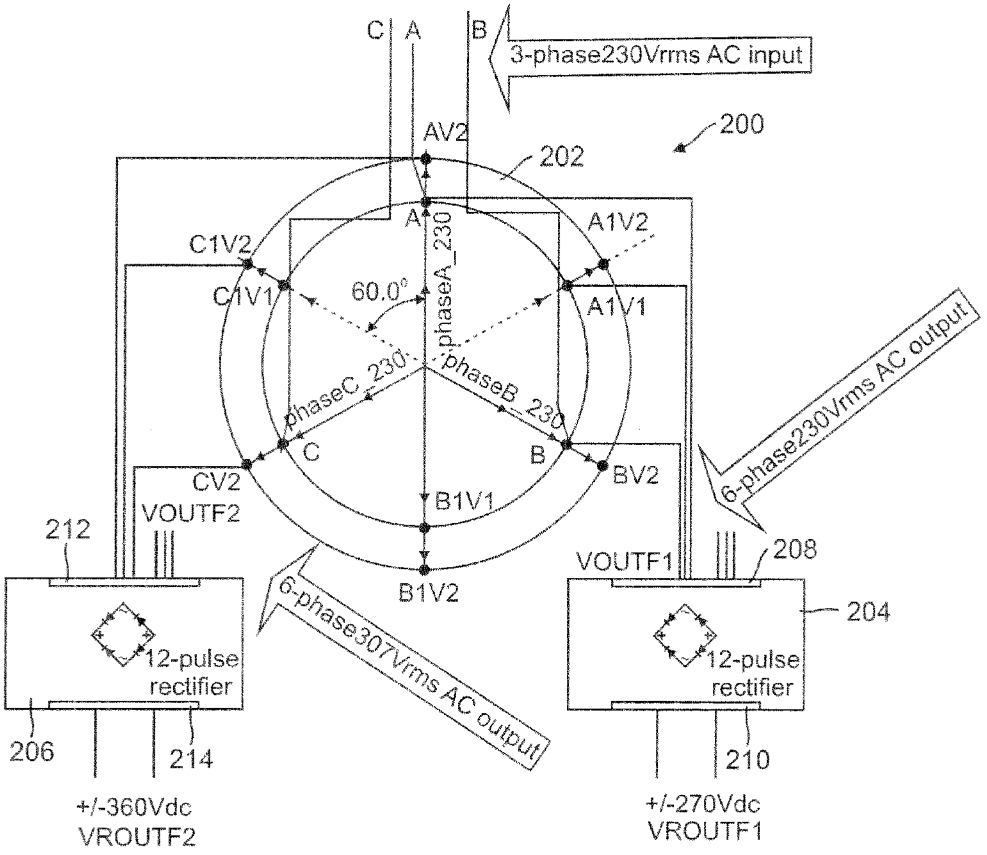
FIG. 2 is an example of an auto-transformer rectifier unit for use with multi-phase auto transformers.

FIG. 2 shows an example of a auto-transformer rectifier system 200. The auto-transformer rectifier system 200 may include an auto-transformer 202, a first multi-pulse rectifier 204 and a second multi-pulse rectifier 206. The auto-transformer 202 may be similar to the auto-transformer described with respect to FIGS. 1A and 1B.

The first multi-phase rectifier 204 may include a first input block 208 and a first output block 210. The first input block 208 may be configured to couple to the second end of secondary windings to receive the first output voltage VoutF1 from the auto-transformer 202. The first multi-phase rectifier 204 rectifies the first output voltage VOUTF1 and provides a rectified first output voltage VROUTF1. The first output voltage VOUTF1 may be the same as the output voltage Vout1 of the auto-transformer, as described above with respect to FIGS. 1A and 1B.

The second multi-phase rectifier 206 may include a second input block 212 and a second output block 212. The second input block 212 is configured to couple to the second end of third windings to receive a second output voltage VOUTF2 from the auto-transformer. The second multi-phase rectifier 206 rectifies the second output voltage VOUTF2 and provides a rectified second output voltage VROUTF2. The second output voltage VOUTF2 may be the same as the output voltage Vout2 of the auto-transformer described above with respect to FIGS. 1A and 1B.

The first output voltage VOUTF1 may be the same as the output voltage Vout1 of the auto-transformer described above with respect to FIGS. 1A and 1B. The second output voltage VOUTF2 may be the same as the output voltage Vout2 of the auto-transformer described above with respect to FIGS. 1A and 1B. As previously described, the auto-transformer 100 of FIGS. 1A and 1B in one embodiment, provides a six phase output Vout1 at the second end of the secondary windings and a six phase output voltage Vout2 at the second end of third windings.

In an exemplary system, an input AC voltage of 230 Volts is applied to the auto-transformer. This may generate a 230 Volts, RMS, AC voltage at the output of the second end of secondary windings, with six phases, with each phase having a positive pulse and a negative pulse. The input AC voltage of 230 Volts may also generate a 307 Volts, RMS, AC voltage at the output of the second end of third windings.

The six 230 Volts, positive pulses are applied to the first input block 208 and rectified by the first multi-phase rectifier 204 to provide +270 Volts DC at the first output block 210. The six negative 230 Volts, pulses are also applied to the first input block 208 and rectified by the first multi-phase rectifier 204 to provide −270 Volts DC at the first output block 210.

The six 307 Volts, positive pulses are applied to the second input block 212 and rectified by the second multi-phase rectifier 206 to provide +360 Volts DC at the second output block 214. The six negative 307 Volts pulses are applied to the second input block 212 and rectified by the second multi-phase rectifier 206 to provide −360 Volts DC at the second output block 214.

Although the embodiment has been described with respect to a six phase (12-pulse) auto-transformer and a 12-pulse rectifier, the disclosure is not limited to this specific example and may be modified suitably to construct auto-transformer rectifier systems to support auto-transformers with different number of output phases. For example, the auto-transformer rectifier system may be adapted for use with various embodiments of multi-phase transformers described in this disclosure.

Figure 3A:
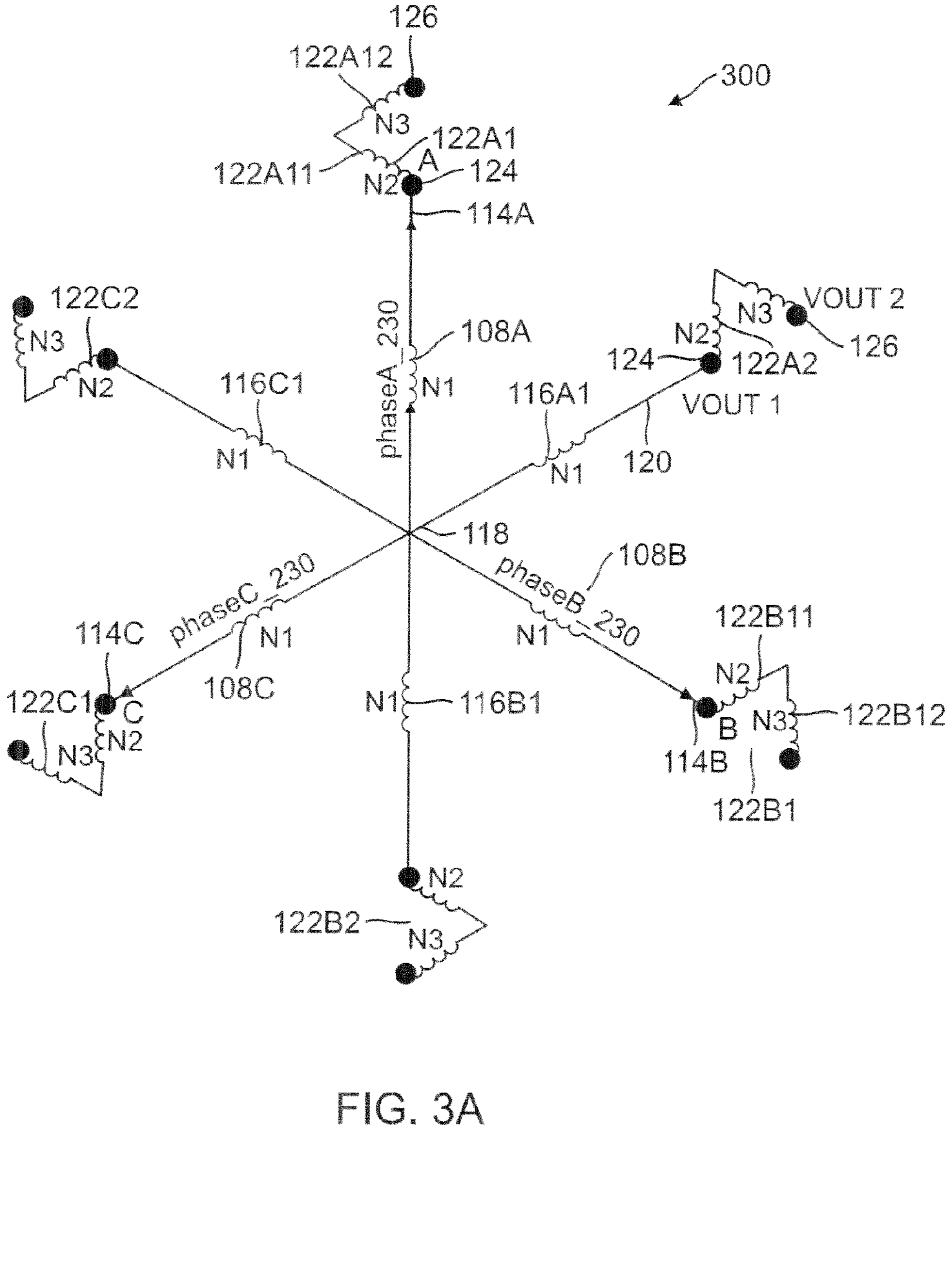
FIG. 3A is a winding diagram for an alternate multi-phase auto-transformer.
Figure 3B:
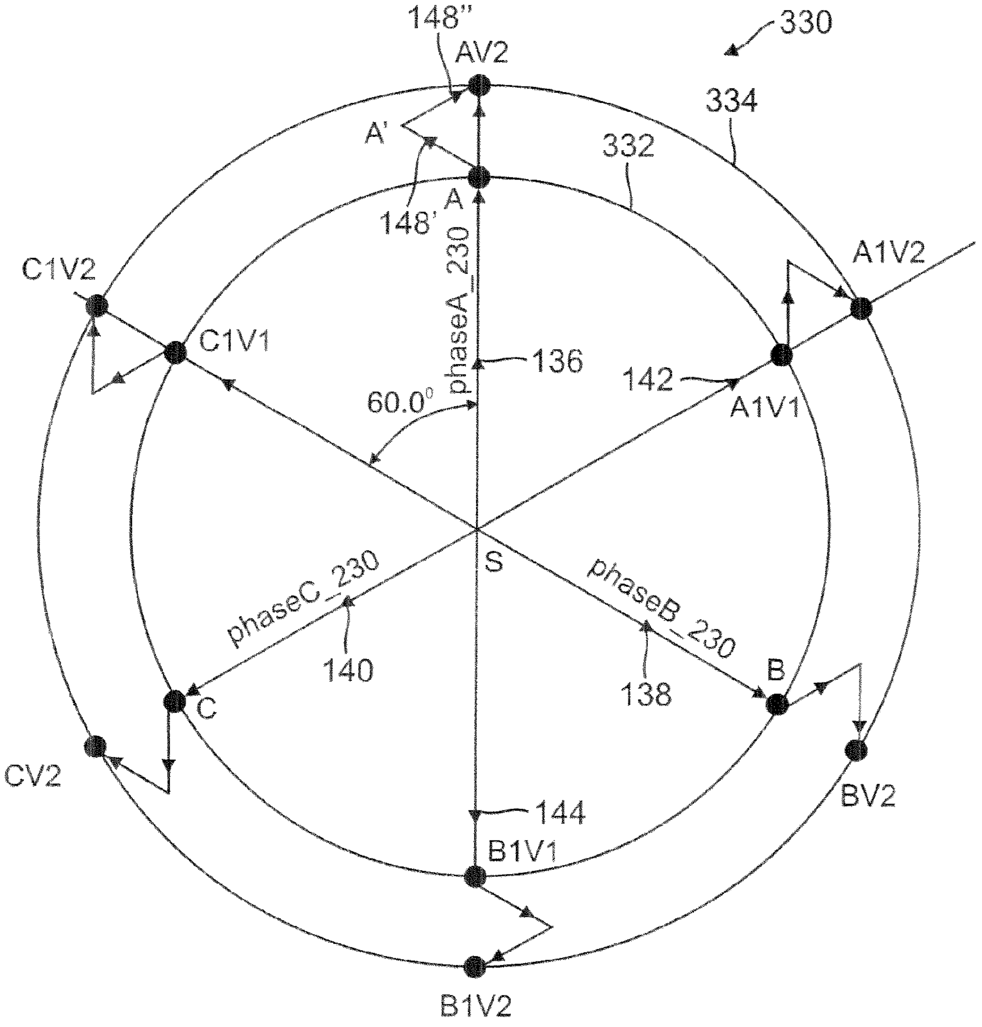
FIG. 3B is a phasor diagram for the multi-phase auto-transformer of FIG. 3A.

Another embodiment of a multi-phase transformer 300 is described with respect to FIGS. 3A and 3B. Transformer 300 is an example of a six phase or twelve pulse multi-phase transformer. The multi-phase transformer 300 described with respect to FIGS. 3A and 3B is substantially similar to the multi-phase transformer 100 described with respect to FIGS. 1A and 1B except that the third group of windings 106 may include a plurality of third windings 122A1-122C2, with each third winding 122A1-122C2 including at least two sub-windings connected in series. Similarities and differences between auto-transformer 100 and auto-transformer 300 will be now described in more detail below.

FIG. 3A is a winding diagram for a multi-phase transformer 300. The transformer 300 may include a first group of windings 102, a second group of windings 104 and a third group of windings 106. The first group of windings 102 and the second group of windings 104 of auto-transformer 200 are constructed and coupled similar to the auto-transformer 100 described above with respect to FIGS. 1A and 1B, with the same reference numerals describing the same elements.

The third group of windings 106 may include a plurality of third windings 122A1-122C2, with the ends of the third windings 122A1-122C2 defining a first end 124 and a second end 126. Each of the third winding 122A1-122C2 may include at least two sub-windings connected in series. For example, third winding 122A1 may include a first sub-winding 122A11 and second sub-winding 122A12 connected in series at one end. The other end of first sub-winding 122A11 corresponds to the first end 124 of the third winding 122A1 and the other end of second sub-winding 122A12 corresponds to the second end 126 of the third winding 122A1.

Each of the third winding 122A1-122C2 may be magnetically coupled to a primary winding 108A-108C. For example, the first sub-winding 122A11 may be magnetically coupled to a primary winding 108A-108C and the second sub-winding 122A12 may be magnetically coupled to a primary winding 108A-108C. The second sub-winding 122A12 may be magnetically coupled to a primary winding 108A-108C different than the primary winding that the first sub-winding 122A11 may be magnetically coupled to.

The first end 124 of each of the third winding 122A1-122C2 may be coupled to a secondary winding 116A-116C or to a primary winding 108A-108C with the third group of windings 106 configured with respect to the first group of windings 102 and the second group of windings 104 such that the output voltage Vout2 at the second end 126 of the third windings 122A1-122C2 is higher than the output voltage Vout1 at the second end 120 of the secondary windings 116A1-116C1 and the second end 114A-114C of the primary windings 108A-108C, respectively.

In one embodiment, the first end 118 of the secondary winding 116A1-116C1 may be coupled to the common junction CJ of the primary windings 108A-108C.

In another embodiment, the first end 124 of some of the third windings 122A1-122C2 may be coupled to the second and 120 of the secondary winding 116A1-116C1. For example, the first end 124 of the third winding 122A2 may be coupled to the second end 122 of secondary winding 116A1.

In one embodiment, the phase angle difference of the output voltage Vout2 at two adjacent second ends 126 of third windings 122A1-122C2 is substantially the same.

In one embodiment, the output voltage Vout2 at the second end 126 of the third windings 122A1-122C2 is substantially equal and the output voltage Vout1 at the second end 120 of secondary windings 116A1-116C1 and at the second end 114A-114C of the primary windings 108A-108C is substantially equal.

In another embodiment, the output voltage Vout2 is greater than output voltage Vout1.

FIG. 3A also shows an example of the number of turns for various windings and sub windings, with some of the windings or sub windings having substantially the same number of turns. For example, the primary windings 108A, 108B and 1081 may have substantially the same number of turns N1. Similarly, the secondary windings 116A1, 116B1 and 116C1 may have substantially the same number of turns N1. For example, the first sub-windings 122A11 and first sub-winding 122B11 of third windings 122A1 and 122B1 may have substantially the same number of turns N2.

Now referring to FIG. 3B, an example of a phasor diagram 330 for the multi-phase transformer 300 of FIG. 3A is provided. The phasor diagram 330 may include a first circle 332 and a second circle 334, both having a common center S that corresponds to the common junction CJ of transformer 300. The lines SA, SB and SC represent the primary windings 108A-108C, respectively.

The phasor diagram details within the first circle 332 is similar to the phasor diagram 130 described with respect to FIG. 1B. Some of the differences between phasor diagram 330 and phasor diagram 130 as it relates to the third windings will be discussed now.

The line A-A' represents the first sub-winding 122A11 of third winding 122A1. Similarly, the line A' -AV2 represents the second sub-winding 122A12 of third winding 122A1. The arrow 148' represents the vector of the induced voltage in the first sub-winding 122A11 and the arrow 148" represents the vector of the induced voltage in the second sub-winding 122A12. Other third windings 122A2-122C2 are similarly represented in the phasor diagram 330.

The lines SA, SB and SC represent the input AC voltage Vin that is applied to the second ends A, B and C of the primary windings. As it is evident from the phasor diagram, a three phase input voltage Vin depicted as phaseA_230, phaseB_230 and phaseC_230 may be applied, with each phase separated by 120 degrees.

As previously described, the lines in a phasor diagrams are vector lines depicting a vector of the induced voltage. For example, the vectors of the induced voltage in primary windings SA, SB and SC are depicted by the arrows 136, 138 and 140.

In one embodiment, a vector of the induced voltage in the primary windings and the secondary windings may be similar to the vector of the induced voltage described with respect to transformer 100.

In one embodiment, a vector of the induced voltage in the third windings and sub-windings of third windings is such that they are either in phase or 180 degrees out of phase with the vector of the induced voltage in a primary winding to which they may be magnetically coupled.

In another embodiment, a vector of the induced voltage in the third windings and sub-windings of sub-windings is such that the phase angle difference of the output voltage at two adjacent second ends of the third windings is substantially the same.

In one embodiment, a vector of the induced voltage in the primary windings and the secondary windings is such that the phase angle difference of the output voltage at two adjacent second ends of the primary windings and the secondary windings is substantially the same.

The phasor diagram 330 shows an example of a vector of the induced voltage in the primary windings, secondary windings and the third windings.

In one embodiment, a vector of the induced voltage in a sub-winding of a third winding is different than the vector of the induced voltage in another sub-winding of the third winding. For example, the vector of the induced voltage in sub-winding 122A11 is different than the vector of the induced voltage in sub-winding 122A12 of third winding 122A1.

In one embodiment, for the third winding coupled to a secondary winding (for example, third winding 122A2), the vector of the induced voltage in the first sub-winding (122A21) is in phase with the vector of the induced voltage in one of the primary winding adjacent the secondary winding (primary winding 108A) and the vector of the induced voltage in the second sub-winding (122A22) is in phase with the vector of the induced voltage in one of the other primary winding adjacent the secondary winding (primary winding 108B).

In one embodiment, for the third winding coupled to an external junction of a primary winding (example, third winding 122A1 coupled to primary winding 108A), the vector of the induced voltage in the first sub-winding (122A11) is about 180 degrees out of phase with the vector of the induced voltage in one of the primary windings, other than the primary winding to which the third winding may be coupled (primary winding 108B). The vector of the induced voltage in the second sub-winding (122A12) is about 180 degrees out of phase with the vector of the induced voltage in one of the other primary windings, other than the primary winding to which the third winding may be coupled (primary winding 108C).

Figure 4A:
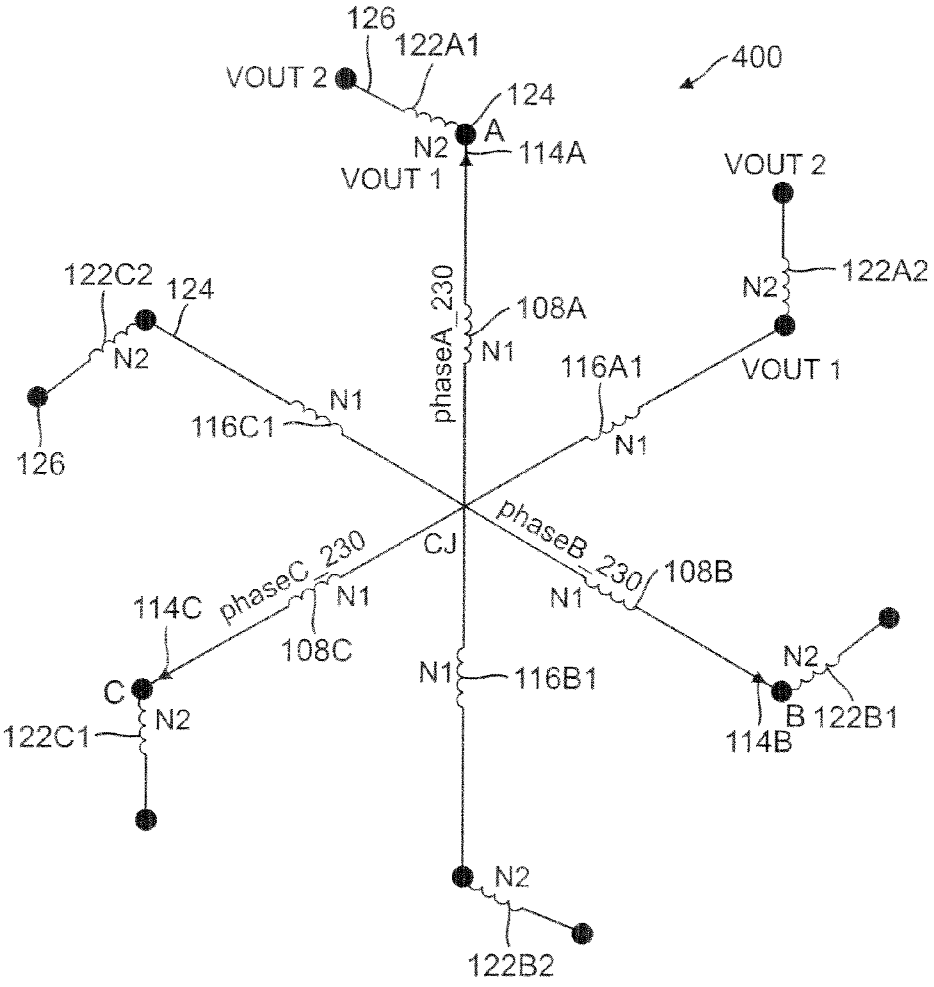
FIG. 4A is a winding diagram for an alternate multi-phase auto-transformer.
Figure 4B:
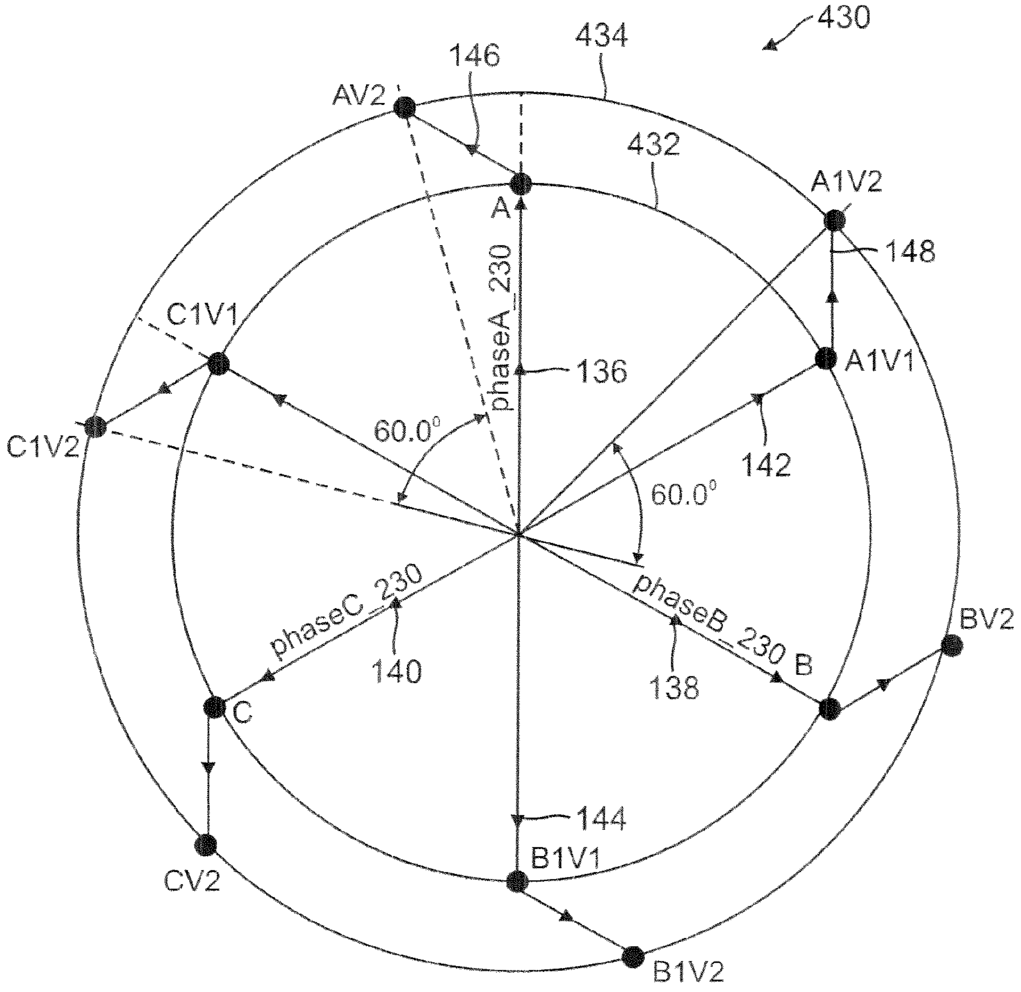
FIG. 4B is a phasor diagram for the multi-phase auto-transformer of FIG. 4A.

In another embodiment, a multi-phase transformer 400 is described with respect to FIGS. 4A and 4B. Transformer 400 is another example of a six-phase or twelve-pulse multi-phase transformer. The multi-phase transformer 400 described with respect to FIGS. 4A and 4B is similar to the multi-phase transformer 100 described above with respect to FIGS. 1A and 1B in that all have a primary group of windings 102, secondary group of windings 104 and third group of windings 106.

One difference between transformer 400 and transformer 100 is that in transformer 400 some of the third windings of the third group of windings may be magnetically coupled to a different primary winding than as shown with respect to transformer 100. Similarity in the construction of transformer 400 and transformer 100 may be understood by referring to FIGS. 4A and 4B and the description of transformer 100 provided above. The description of transformer 400 is limited to a description of third windings and the magnetic coupling of the third windings.

Referring to FIG. 4A, the third group of windings 106 may include a plurality of third windings 122A1, 122A2, 122B1, 122B2, 122C1 and 122C2. Each third winding 122A1-122C2 has a first end 124 and a second end 126. Each third winding 122A1-122C2 may be magnetically coupled to one of the primary windings 108A-108C.

The first end 124 of each of the third winding 122A1-122C2 may be coupled to a primary winding 108A-108C. The third group of windings 106 may be configured with respect to the first group of windings 102 and the second group of windings 104 such that the output voltage Vout2 at the second end 126 of the third windings 122A1-122C2 is higher than the output voltage Vout1 at the second end 120 of the secondary windings 116A-116C and the second end 114A-114C of the primary windings 108A-108C.

In one embodiment, a phase angle difference of the output voltage Vout2 at two adjacent second ends of the third windings is substantially the same. For example, the phase angle difference of the output voltage Vout2 at second end 126 of two adjacent third windings 122A1-122A2, 122A2-122B1, 122B1-122B2, 122B2-122C1, 122C1-122C2 and 122C2-122A1 is substantially the same.

In one embodiment, the output voltage Vout2 at the second end of the third windings is substantially equal. For example, the output voltage Vout2 at the second end 126 of the third windings 122A1-122C2 is substantially the same.

In one embodiment, the output voltage Vout1 at the second end of secondary windings 116A1-116C1 and at the second end of the primary windings 108A-108C is substantially equal. For example, the output voltage Vout1 at the second end 120 of secondary windings 116A1-116C1 and at the second end 114A-114C of primary windings 108A-108C is substantially equal.

In one embodiment, the output voltage Vout2 is greater than the output voltage Vout1.

FIG. 4A also shows an example of a number of turns for various windings and sub windings, with some of the windings having substantially the same number of turns. For example, the third windings 122A1 and 122A2 may have substantially the same number of turns N2.

Now referring to FIG. 4B, an example of a phasor diagram 430 for the multi-phase transformer 400 of FIG. 4A is disclosed. The phasor diagram 430 may include a first circle 432 and a second circle 434, both having a common center S. With respect to the primary windings and the secondary windings, the phasor diagram 430 is similar to the phasor diagram 130 described above with respect to transformer 100. For example, a vector of the induced voltage in the primary windings and the secondary windings are the same. Some of the differences with respect to the third windings will now be described.

Similar to the phasor diagram 130, lines A-AV2, A1V1-A1V2 represent third windings 122A1-122A2, respectively. In transformer 400, a vector of the induced voltage in the third windings is different than the vector of the induced voltage in the third windings of transformer 100. The phasor diagram 430 shows an example of a vector of the induced voltage in the primary windings, secondary windings and the third windings.

For example, in one embodiment, for the third winding coupled to a second winding (example, third winding 122A2), the vector of the induced voltage in the third winding is substantially the same as the vector of the induced voltage in one of the primary windings adjacent the second winding (primary winding 108A).

In one embodiment, for the third winding coupled to a second end of a primary winding (example, third winding 122A1 coupled to primary winding 108A), the vector of the induced voltage in the third winding is about 180 degrees out of phase with the vector of the induced voltage in a primary winding (primary winding 108B) other than the primary winding to which the third winding may be coupled to.

In another embodiment, a vector of the induced voltage in the primary windings and the secondary windings is such that a phase angle of the output voltage at the second end of the third winging is different than a phase angle of the output at the second end of the primary winding or the secondary winding to which the first end of the third winding may be coupled. For example, the vector of the induced voltage in secondary winding 116A1 as depicted by arrow 142 is different than the vector of the induced voltage in the third winding 122A2, which may be coupled to secondary winding 116A1, as depicted by the arrow 148.

In one embodiment, the third windings may be magnetically coupled to a primary winding such that the phase angle difference of the output voltage at two adjacent second ends of the third windings is substantially the same.

In one embodiment, a vector of the induced voltage in the primary windings and the secondary windings is such that the phase angle difference of the output voltage at the two adjacent second ends of the primary windings and the secondary windings is substantially the same.

Figure 5A:
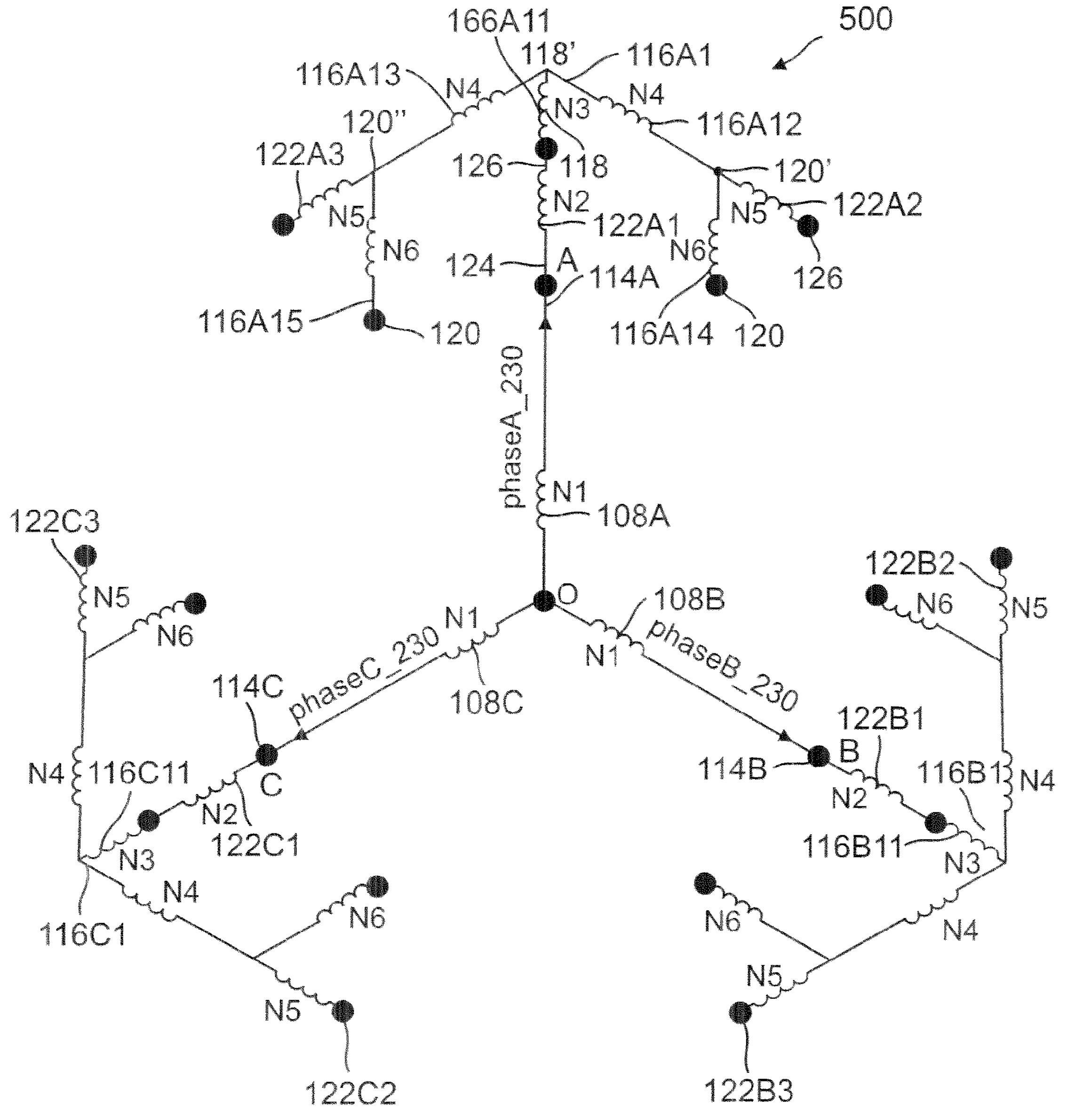
FIG. 5A is a winding diagram for an alternate multi-phase auto-transformer.
Figure 5B:
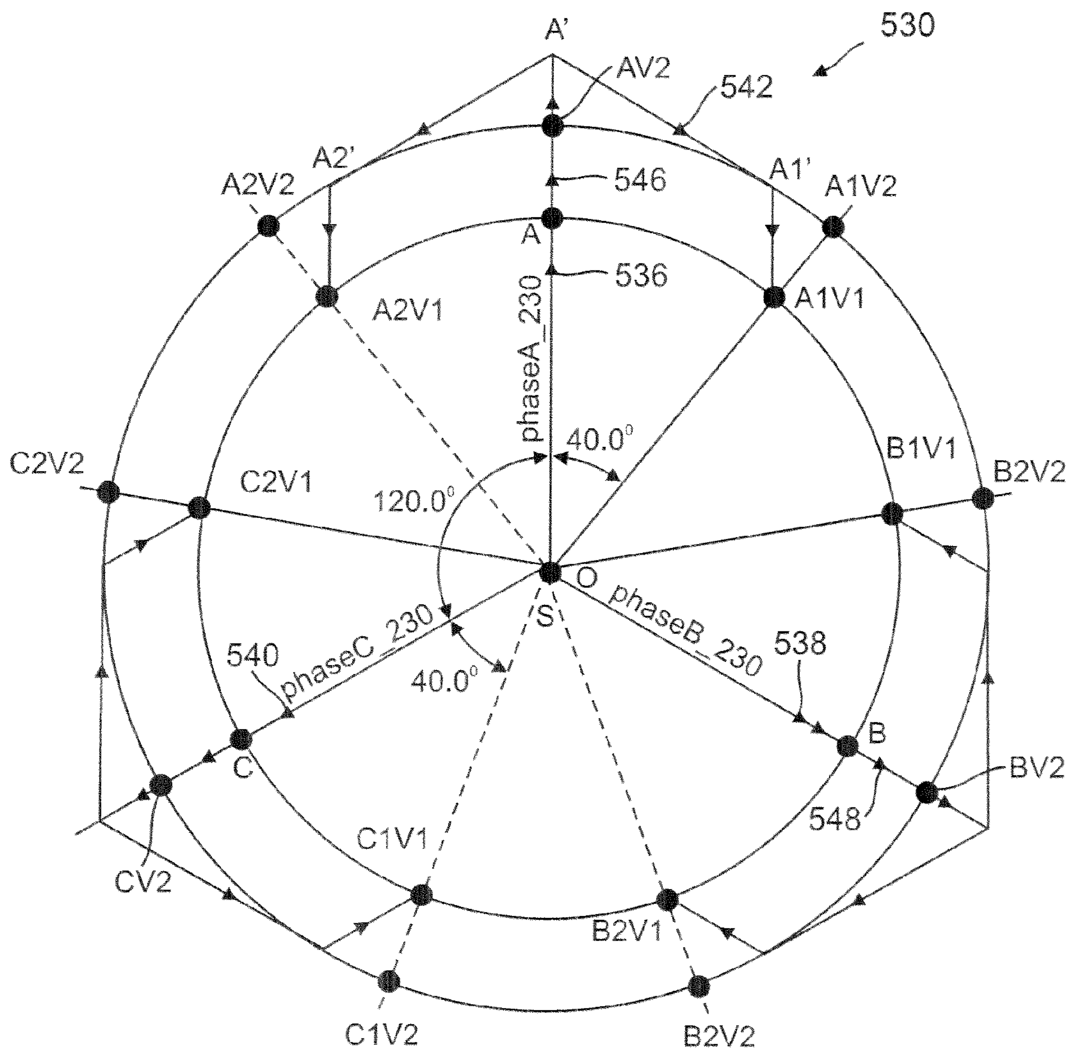
FIG. 5B is a phasor diagram for the multi-phase auto-transformer of FIG. 5A.

Another embodiment of multi-phase transformer is described with respect to FIGS. 5A and 5B. Transformer 500 is an example of a nine-phase or eighteen-pulse multi-phase transformer. The multi-phase transformer 500 described with respect to FIGS. 5A and 5B is similar to the multi-phase transformer 100 described with respect to FIGS. 1A and 1B.

One of e differences between transformer 500 and transformer 100 is that the secondary windings of the second group of windings include a plurality of sub-windings. Also, the first end of the secondary windings are coupled to the second end of the third windings. The description of transformer 500 will be limited to secondary windings and the third windings. Similarity in the construction of the transformer 500 with respect to transformer 100 may be understood by referring to FIG. 5A and 5B and description of transformer 100 provided herein above.

Referring to FIG. 5A, in this embodiment, the second group of windings 104 may include a plurality of secondary windings 116A1, 116B1 and 116C1. Each secondary winding, for example, secondary winding 116A1-116C1 includes a first end 118 and at least a second end 120. The secondary windings 116A1-116C1 may also include a plurality of sub-windings connected at a sub-junction.

For example, the secondary winding 116A1 may include a first sub-winding 116A11 and a plurality of second sub-windings 116A12, 116A13, 116A14 and 116A15. One end of the first sub-winding 116A11, second sub-winding 116A12 and second sub-winding 116A13 are coupled together to define a sub-junction 118'. The other end of the first sub-winding 116A11 corresponds to the first end 118 of secondary winding 116A1. The other end of the second sub-winding 116A12 may be coupled to an end of another second sub-winding 116A14 at sub-junction 120'. The other end of second sub-winding 116A14 corresponds to a second 120 of secondary winding 116A2. The other end of the second sub-winding 116A13 may be coupled to an end of another second sub-winding 116A15 at sub-junction 120". The other end of second sub-winding 116A15 corresponds to another second end 120 of secondary winding 116A2.

Each secondary winding 116A1-116C1 may be magnetically coupled to one of the primary windings 108A-108C. In one embodiment, each of the sub-windings for example, first sub-windings and second sub-windings may be magnetically coupled to different primary windings. The first end 118 of each secondary winding, for example, secondary winding 116A1-116C1 may be coupled to a second end of third winding 122A1-122A3. For example, the first end 118 of secondary winding 116A1 may be coupled to second end of third winding 122A1.

The third group of windings 106 may include a plurality of third windings. For example, plurality of third windings 122A1-122A3, 122B1-122B3 and 122C1-122C3. Each third winding, for example 122A1-122C3 has a first end 124 and a second end 126. Each third winding 122A1-122C3 may be magnetically coupled to one of the primary windings, for example, a primary winding 108A-108C.

In one embodiment, the first end 124 of some of the third windings, for example, third winding 122A1 may be coupled to a primary winding, for example, primary winding 108A. For example, some of the first end 124 are coupled to one of the second ends 114A-114C. For example, the first end 124 of the third winding 122A1 may be coupled to second end 114A.

In one embodiment, the first end 124 of some of the third windings, for example, third windings 122A2-122A3 may be coupled to a secondary winding, for example, secondary winding 116A1. For example, some of the first end 124 is coupled to one of the sub-junctions of a secondary winding. The first end 124 of third winding 122A2 may be coupled to sub-junction 120' of secondary winding 116A1. The first end 124 of third winding 122A3 may be coupled to sub-junction 120" of secondary winding 116A2.

In one embodiment, a phase angle difference of the output voltage Vout2 at two adjacent second ends of third windings is substantially the same. For example, the phase angle difference of the output voltage Vout2 at second end 126 of two adjacent third windings 122A1-122A2 is substantially the same.

In one embodiment, the output voltage Vout2 at the second end of the third windings is substantially equal. For example, the voltage Vout2 at the second end 126 of the third windings 122A1-122A3, 122B1-122B3 and 122C1-122C3 is substantially the same.

In one embodiment, an output voltage Vout1 at the second end of secondary windings and at the second end of the primary windings is the same. For example, the output voltage Vout1 at the second end 120 of secondary windings 116A1, 116B1 and 116C1 and at the second end 114A-114C of the primary windings 108A-108C is substantially equal.

In one embodiment, the output voltage Vout2 is greater than output voltage Vout1.

FIG. 5A also shows an example of a number of turns (for example, N1-N6) for various windings and sub-windings, with some of the windings or sub-windings having substantially the same number of turns. For example, primary windings 108A, 108B and 108C each may have substantially the same number of turns, for example, N1. Similarly, sub-windings of secondary windings, for example, first sub-windings 116A11, 116B11 and 116C11 each may have substantially the same number of turns, for example, N3. Similarly, third windings 122A2 and 122A3 each may have substantially the same number of turns, for example, N5.

Now referring to FIG. 5B, a phasor diagram 530 for the multi-phase transformer 500 of FIG. 5A is shown. The phasor diagram 530 may include a first circle 532 and a second circle 534, both having a common center S. With respect to the primary windings, the phasor diagram 530 is similar to the phasor diagram 130 described above with respect to transformer 100. For example, lines SA, SB and SC represent primary windings 108A, 108B and 108C, respectively. Some of the differences with respect to the secondary windings and third windings will now be described.

Points A1V1-A2V1, B1V1-B2V1 and C1V1-C2V1 represent the second ends 120 of the secondary windings 116A1, 116B1 and 116C1, respectively. Similarly points AV2, A1V2, A2V2; BV2, B1V2, B2V2; and CV2, C1V2 and C2V2 represent the second end 126 of the third windings 122A1-122A3, 122B1-122B3 and 122C1-122C3, respectively. Points A', A1' and A2' represent sub-junctions 118', 120' and 120" of secondary winding 116A, respectively.

As an example, line AV2-A' represents the first sub-winding 122A11, line A'-A1' represents the second sub-winding 122A12, line A'-A2' represents the second sub-winding 122A13, line A1'-A1V1 represents the second sub-winding 122A14 and line A2'-A2V1 represents the second sub-winding 122A15 of secondary winding 116A. Lines A-AV2, A1'-A1V2, A2'-A2V2 represent third windings 122A1-122A3, respectively.

As previously discussed, the length of the lines in a phasor diagram represents the number of turns for the windings. For example, the length of line S-A represents number of turns N1 for primary winding 108A. Similarly, the length of line AV2-A' represents number of turns N3 for first sub-winding 116A11 of secondary winding 116A1. The length of line A1'-A1V2 represents the number of turns N5 for third winding 122A2.

The lines SA, SB and SC represents the input AC voltage Vin applied to the second ends A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting a vector of the induced voltage. For example, the vector of the induced voltage in primary windings SA, SB and SC are depicted by the arrows 536, 538 and 540. Similarly, the arrows on lines representing the secondary windings and the third windings represent the vector of the induced voltage. For example, arrows 542 and 544 represent the vector of the induced voltage in the sub-windings 116A12 and 116A13 of secondary winding 116A1. The arrows 546 and 548 represent the vector of inducted voltage in the third winding 122A1 and 122B1.

In one embodiment, a vector of the induced voltage in the primary windings and the secondary windings is such that a phase angle difference of the output voltage at two adjacent second ends of the primary windings and the secondary windings is substantially the same. In one embodiment, some of the sub-windings of a secondary winding may be magnetically coupled to different primary windings.

In another embodiment, a vector of the induced voltage in the third windings is such that the phase angle difference of the output voltage at two adjacent second ends of the third windings is substantially the same. The phasor diagram 530 shows an example of the vector of the induced voltage in the secondary windings and the third windings.

Additional embodiments of multi-phase transformers will be described now. One common feature of these multi-phase transformers is that in the first group of windings, each of the primary windings may include a plurality of sub primary windings. The sub primary windings are coupled in series at an interior junction. One end of each of the primary windings is coupled together at a common junction to form a WYE configuration. The other end of the primary windings defines a second end. Various embodiments of multi-phase transformers with a plurality of sub primary windings will now be described.

Figure 6A:
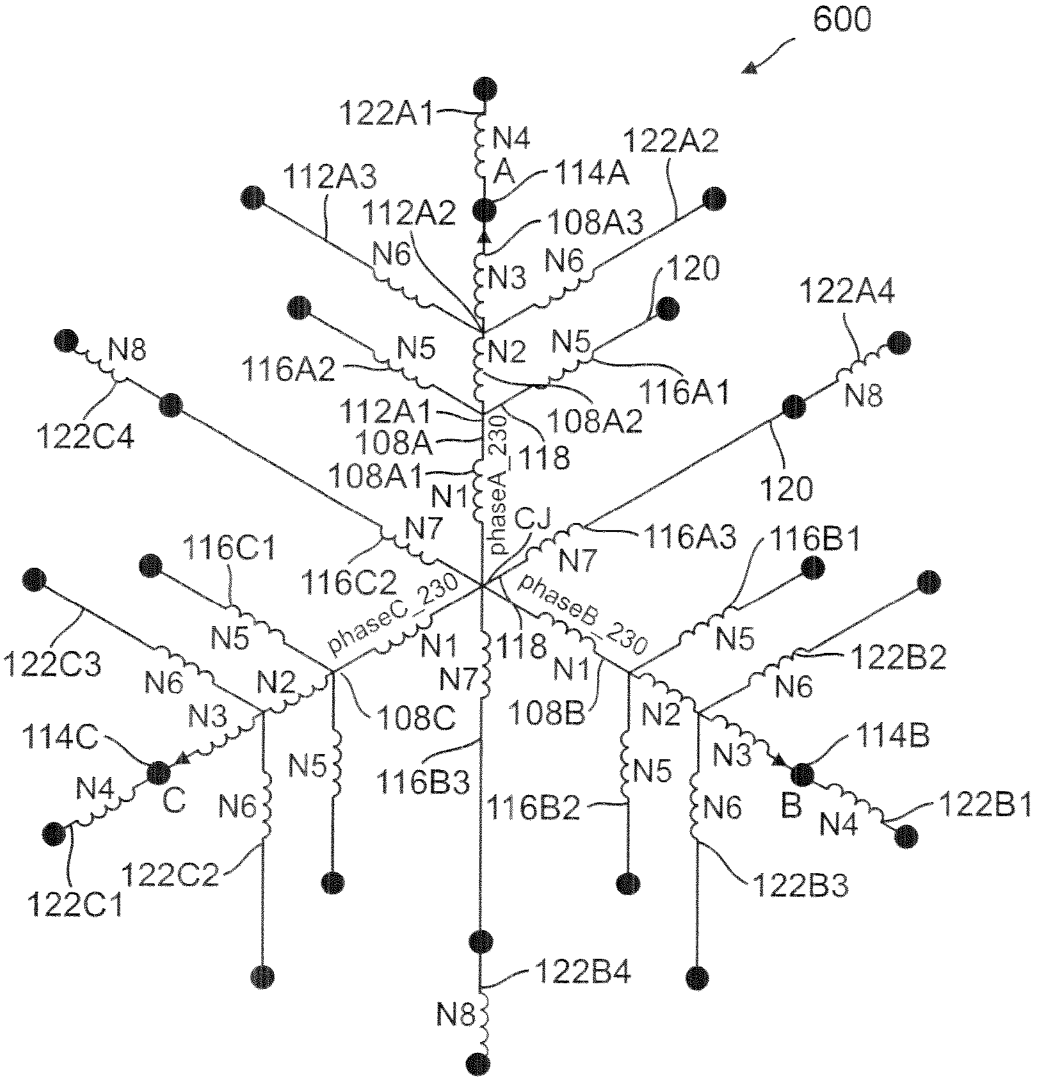
FIG. 6A is a winding diagram for an alternate multi-phase auto-transformer.
Figure 6B:
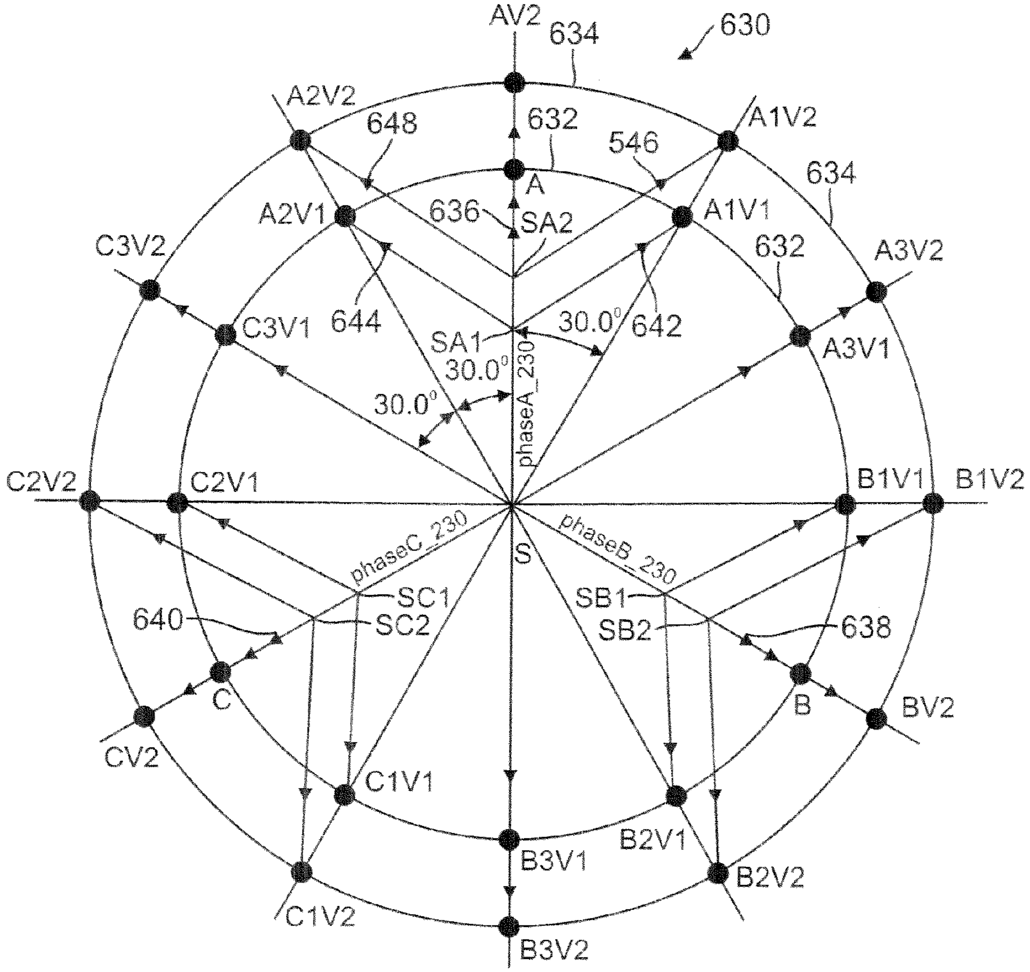
FIG. 6B is a phasor diagram for the multi-phase auto-transformer of FIG. 6A.

FIGS. 6A and 6B show an example of a multi-phase transformer 600, according to one embodiment. Transformer 600 is an example of a nine-phase or eighteen-pulse multi-phase transformer. Transformer 600 is similar to the multi-phase transformer 100 described above with respect to FIGS. 1A and 1B in that multi-phase transformer 600 has a primary group of windings 102, secondary group of windings 104 and third group of windings 106. One difference between transformer 600 and transformer 100 is that the primary windings include a plurality of sub windings coupled in series.

Referring to FIG. 6A, in this embodiment, the first group of windings 102 may include a plurality of primary windings 108A-108C. One end of the primary windings is coupled together at a common junction CJ to form a WYE configuration. The second end of each of the primary windings is configured to receive one phase of a multi-phase input voltage.

Each of the primary windings may include a plurality of sub windings. For example, primary winding 108A may include a plurality of sub windings 108A1, 108A2 and 108A3. One end of sub winding 108A1 may be coupled to the common junction CJ. Sub windings 108A1 and 108A2 are coupled together in series at interior junction 112A1. Sub windings 108A2 and 108A2 are coupled together in series at interior junction 112A2. The other end of sub winding 108A3 defines the second end 114A of the primary winding 108A.

Primary windings 108B and 108C are similarly constructed. For example, primary winding 108B may include sub primary windings 108B1-108B3 and interior junctions 112B1-112B2. Primary winding 108C may include sub primary windings 108C1-108C3 and interior junctions 112C1-112C2, respectively.

The second group of windings 104 may include a plurality of secondary windings 116A1-116A3, 116B1-116B3 and 116C1-116C3. Each secondary winding, for example, secondary winding 116A1-116C3 has a first end 118 and a second end 120.

Each secondary winding 116A1-116C3 may be magnetically coupled to one of the primary windings 108A-108C. The first end 118 of some of the secondary windings, for example, secondary winding 116A3 may be coupled to the common junction CJ. The first end 118 of some of the secondary windings may be coupled to an interior junction of a primary winding. For example, secondary winding 116A1 may be coupled to an interior junction 122A1 of primary winding 108A.

The third group of windings 106 may include a plurality of third windings. For example, plurality of third windings 122A1-122A3, 122B1-122B3 and 122C1-122C3. Each third winding, for example 122A1-122C3 has a first end 124 and a second end 126. Each third winding 122A1-122C3 max be magnetically coupled to one of the primary windings, for example, a primary winding 108A-108C.

In one embodiment, the first end 124 of some of the third windings may be coupled to a primary winding. For example, the first end 124 of third winding 122A1 may be coupled to the second end 114A of primary winding 108A.

In one embodiment, the first end 124 of some of the third windings may be coupled to an interior junction of a primary winding. For example, the first end 124 of third winding 122A2 may be coupled to interior junction 122A2 of primary winding 108A.

In one embodiment, a phase angle difference of the output voltage Vout2 at two adjacent second ends of third windings is substantially the same. For example, the phase angle difference of the output voltage Vout2 at second end 126 of two adjacent third windings 122A1-122A2 is substantially the same.

In one embodiment, the output voltage Vout2 at the second end of the third windings is substantially equal. For example, the output voltage Vout2 at the second end 126 of the third windings 122A1-122A3, 122B1-122B3 and 122C1-122C3 is substantially the same.

In one embodiment, the output voltage Vout1 at the second end of secondary windings and at the second end of the primary windings is the same. For example, the output voltage Vout1 at the second end 120 of secondary windings 116A1-116A3, 116B1-116B3 and 116C1-116C3 and at the second end 114A-114C of the primary windings 108A-108C is substantially equal.

In one embodiment, the output voltage Vout2 is greater than output voltage Vout1.

FIG. 6A also shows an example of the number of turns (N1-N8) for various windings and sub-windings, with some of the windings or sub-windings having substantially the same number of turns. For example, sub primary windings 108A1, 108B1 and 108C1 each may have substantially the same number of turns, for example, N1. Similarly, secondary windings, for example, secondary windings 116A3, 116B3 and 116C3 each may have substantially the same number of turns, for example, N7. Similarly, third windings 122A2 and 122A3 each may have substantially the same number of turns, for example, N6.

FIG. 6B shows an example of a phasor diagram 630 for multi-phase transformer 600 of FIG. 6A. The phasor diagram 630 may include a first circle 632 and a second circle 634, both having a common center S. With respect to the primary windings, the phasor diagram 530 is similar to the phasor diagram 130 described above with respect to transformer 100. For example, lines SA, SB and SC represent primary windings 108A, 108B and 108C, respectively. Some of the differences with respect to the primary windings, secondary windings and third windings will be described now.

Points SA1, SA2, SB1, SB2, SC1 and SC2 represent the interior junctions 112A1, 112A2, 112B1, 112B2, 112C1 and 112C2 of primary windings, respectively. Line S-SA1 represents the sub primary winding 108A1.

Points A1V1-A3V1, B1V1-B3V1 and C1V1-C3V1 represent the second ends 120 of the secondary windings 116A1-116A3, 116B1-116B3 and 116C1-116C3, respectively. Similarly points AV2, A1V2, A2V2, A3V2; BV2, B1V2, B2V2, B3V2; and CV2, C1V2, C2V2 and C3V2 represent the second end 126 of the third windings 122A1-122A4, 122B1-122B4 and 122C1-122C4, respectively. Lines A-AV, A1V1-A1V2, A2V1-A2V2 and A3V1-A3V2 represent third windings 122A1-122A4, respectively.

As previously discussed, a length of a line in a phasor diagram represents the number of turns for the windings. For example, the length of line S-SA1 represents number of turns N1 for sub primary winding 108A1. Similarly, the length of line SA1-A1V1 represents number of turns N5 for secondary winding 116A1. The length of line SA2-A1V2 represents the number of turns N6 for third winding 122A2.

Lines SA, SB and SC represent the input AC voltage Vin applied to the second ends A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting a vector of the induced voltage. For example, the vector of the induced voltage in primary windings SA, SB and SC are depicted by the arrows 636, 638 and 640. Similarly, the arrows on lines representing the secondary windings and the third windings represent the vector of the induced voltage. For example, arrows 642 and 644 represent the vector of the induced voltage in the secondary windings 116A1 and 116A2, respectively. The arrows 646 and 648 represent the vector of inducted voltage in the third winding 122A2 and 122A3, respectively.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same. The phasor diagram 630 shows an example of a vector of the induced voltage in the secondary windings and the third windings.

Figure 7A:
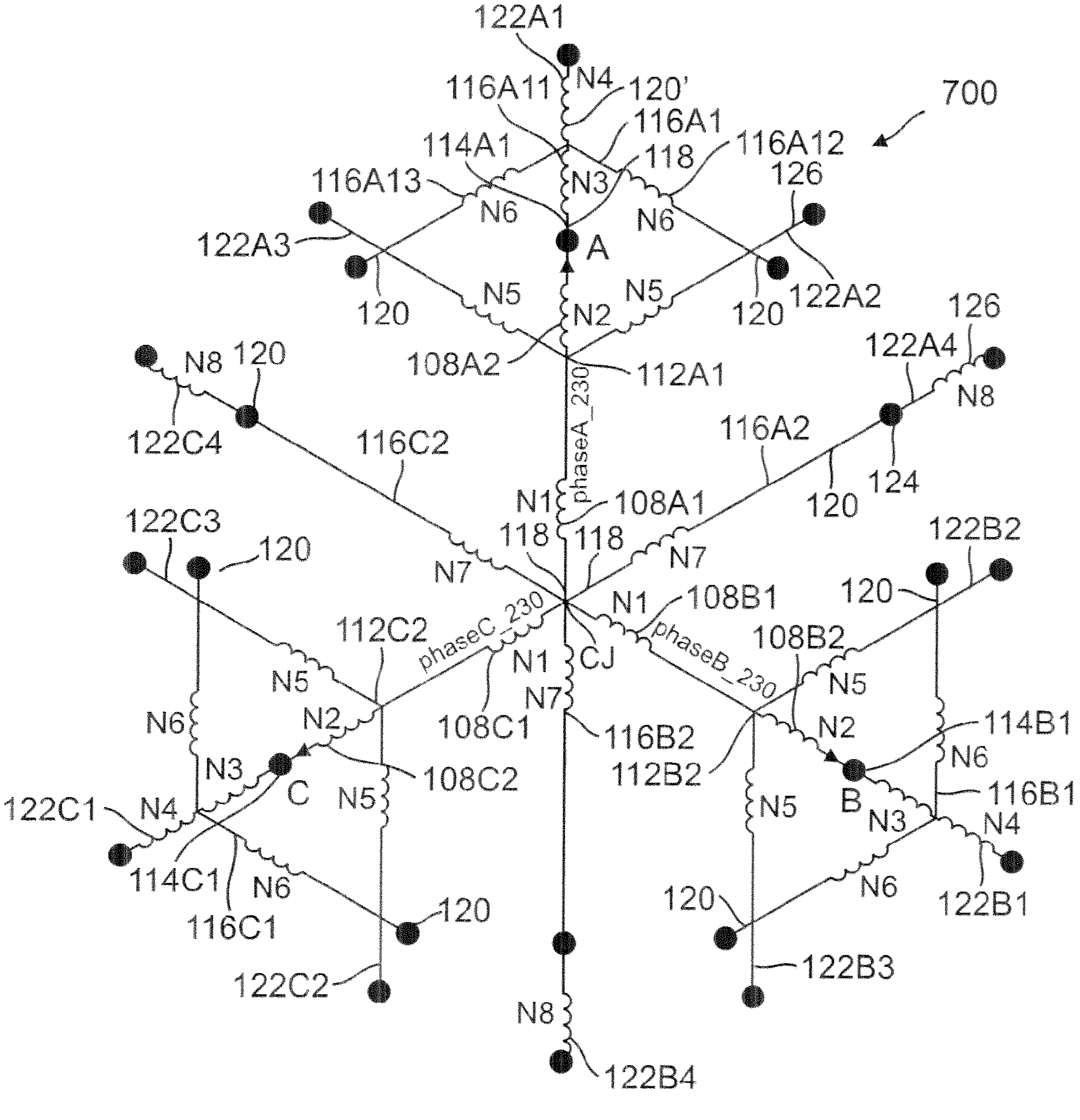
FIG. 7A is a winding diagram for an alternate multi-phase auto-transformer.
Figure 7B:
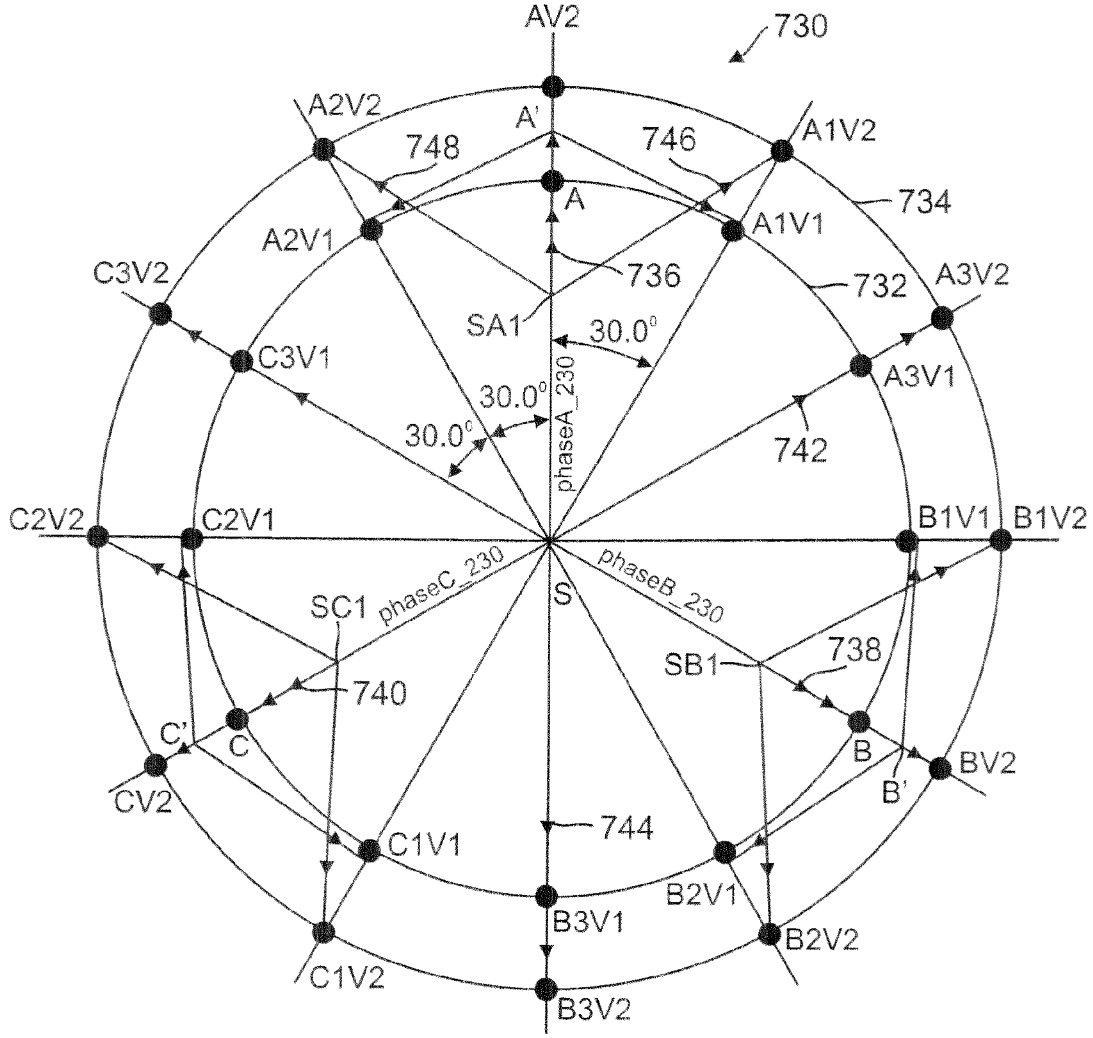
FIG. 7B is a phasor diagram for the multi-phase auto-transformer of FIG. 7A.

Another embodiment of a multi-phase transformer 700 is now described with respect to FIGS. 7A and 7B. Transformer 700 is an example of a twelve-phase or twenty-four pulse multi-phase transformer. The multi-phase transformer 700 is similar to the multi-phase transformer 600 described above with respect to FIGS. 6A and 6B. One difference between transformer 700 and transformer 600 is that in transformer 700, the secondary windings include a plurality of sub windings.

Referring to FIG. 7A, in this embodiment of transformer 700, the first group of windings 102 may include a plurality of primary windings 108A-108C. One end of the primary windings is coupled together at a common junction CJ to form a WYE configuration. The second end of each of the primary windings is configured to receive one phase of a multi-phase input voltage.

Each of the primary windings includes a plurality of sub windings. For example, primary winding 108A may include a plurality of sub windings 108A1 and 108A2. One end of sub winding 108A1 may be coupled to the common junction CJ. Sub windings 108A1 and 108A2 are coupled together in series at interior junction 112A1. The other end of sub winding 108A2 defines the second end 114A of the primary winding 108A.

Primary windings 108B and 108C are similarly constructed. For example, primary winding 108B may include sub primary windings 108B1-108B2 and interior junction 112B1. Primary winding 108C may include sub primary windings 108C1-108C2 and interior junction 112C1.

The second group of windings 104 may include a plurality of secondary windings 116A1-116A2, 116B1-116B2 and 116C1-116C2. Each secondary winding, for example, secondary winding 116A1-116C2 has a first end 118 and at least one second end 120. For example, secondary windings 116A1, 116B1 and 116C1 may have two second ends 120.

The secondary windings 116A1, 116B1 and 116C1 include a plurality of sub-windings. Secondary winding will now be described in detail with respect to secondary winding 116A1.

The secondary winding 116A1 may include a first sub-winding 116A11 and a plurality of second sub-windings 116A12 and 116A13. One end of the first sub-winding 116A11, second sub-winding 116A12 and second sub-winding 116A13 are coupled together to define a sub-junction 120'. The other end of first sub-winding 116A11 corresponds to the first end 118 of secondary winding 116A1. The other end of second sub-winding 116A12 corresponds to a second end 120 of secondary winding 116A1. The other end of second sub-winding 116A13 corresponds to another second end 120 of secondary winding 116A1.

Each secondary winding 116A1-116C2 may be magnetically coupled to one of the primary windings 108A-108C. In one embodiment, sub-windings of a secondary winding may be magnetically coupled to different primary windings. The first end 118 of some of the secondary windings, for example, secondary winding 116A2 may be coupled to the common junction CJ. The first end 108 of some of the secondary windings may be coupled to the second end of a primary winding. For example, first end 118 of secondary winding 116A1 may be coupled to second end 114A1 of primary winding 108A.

The third group of windings 106 may include a plurality of third windings. For example, plurality of third windings 122A1-122A4, 122B1-122B4 and 122C1-122C4. Each third winding, for example 122A1-122C4 has a first end 124 and a second end 126. Each third winding 122A1-122C4 may be magnetically coupled to one of the primary windings, for example, a primary winding 108A-108C.

In one embodiment, the first end 124 of some of the third windings may be coupled to a primary winding. For example, the first end 124 of third winding may be coupled to interior junction 112A1 of primary winding 108A.

In one embodiment, the first end 124 of some of the third windings may be coupled to a sub-junction of a secondary winding. For example, the first end 124 of third winding 122A1 may be coupled to sub-junction 120' of secondary winding 116A1.

In one embodiment, the first end 124 of some of the third windings may be coupled to a second end of a secondary winding. For example, the first end 124 of third winding 122A4 may be coupled to second end 120 of secondary winding 116A2.

In one embodiment, a phase angle difference of the output voltage Vout2 at two adjacent second ends of third windings is substantially the same. For example, the phase angle difference of the output voltage Vout2 at second end 126 of two adjacent third windings 122A1-122A2 is substantially the same.

In one embodiment, the output voltage Vout2 at the second end of the third windings is substantially equal. For example, the output voltage Vout2 at the second end 126 of the third windings 122A1-122A4, 122B1-122B4 and 122C1-122C4 is substantially the same.

In one embodiment, the output voltage Vout1 at the second end of secondary windings and at the second end of the primary windings is the same. For example, the output voltage Vout1 at the second end 120 of secondary windings 116A1-116A2, 116B1-116B2 and 116C1-116C2 and at the second end 114A-114C of the primary winding 108A-108C is substantially equal. In one embodiment, the output voltage Vout2 is greater than output voltage Vout1.

FIG. 7A also shows an example of a number of turns (for example, N1-N8) for various windings and sub-windings, with some of the windings or sub-windings having substantially the same number of turns. For example, sub primary windings 108A1, 108B1 and 108C1 each may have substantially the same number of turns, for example, N1. Similarly, secondary windings, for example, secondary windings 116A2, 116B2 and 116C2 each may have substantially the same number of turns, for example, N7. Similarly, third windings 122A2 and 122A3 each may have substantially the same number of turns, for example, N5.

FIG. 7B shows a phasor diagram 730 for the multi-phase transformer 700. The phasor diagram 730 may include a first circle 732 and a second circle 734, both having a common center S. With respect to the primary windings, the phasor diagram 730 is similar to the phasor diagram 630 described with respect to transformer 600. For example, lines SA, SB and SC represent primary windings 108A, 108B and 108C, respectively. Some of the differences with respect to the primary windings, secondary windings and third windings will be described now.

Points SA1, SB1 and SC1 represent the interior junctions 112A1, 112B1 and 112C1 of primary windings 108A-108C, respectively. For example, line S-SA1 represents the sub primary winding 108A1.

Points A1V1-A3V1, B1V1-B3V1 and C1V1-C3V1 represent the second ends 120 of the secondary windings 116A1-116A2, 116B1-116B2 and 116C1-116C2, respectively. Points A', B' and C' represent the sub-junction 120' of secondary windings 116A1, 116B1 and 116C1, respectively.

Similarly points AV2, A1V2, A2V2, A3V2; BV2, B1V2, B2V2, B3V2; and CV2, C1V2, C2V2 and C3V2 represent the second end 126 of the third windings 122A1-122A4, 122B1-122B4 and 122C1-122C4 respectively. Lines A'-AV2, SA1-A1V2, SA1-A2V2 and A3V1-A3V2 represent third windings 122A1-122A4 respectively.

As previously discussed, a length of a line in a phasor diagram represents the number of turns for the windings. For example, the length of line S-SA1 represents number of turns N1 for sub primary winding 108A1. Similarly, the length of line S-A3V1 represents number of turns N7 for secondary winding 116A2. The length of line SA1-A1V2 represents the number of turns N5 for third winding 122A2.

The lines SA, SB and SC represents the input AC voltage Vin applied to the second ends A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting a vector of the induced voltage. For example, the vector of the induced voltage in primary windings SA, SB and SC is depicted by the arrows 736, 738 and 740. Similarly, the arrows on lines representing the secondary windings and the third windings represent the vector of the induced voltage. For example, arrows 742 and 744 represent the vector of the induced voltage in the secondary windings 116A2 and 116B2 respectively. The arrows 746 and 748 represent the vector of inducted voltage in the third winding 122A2 and 122A3 respectively.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same.

The phasor diagram 730 shows an example of a vector of the induced voltage in the secondary windings and the third windings.

Figure 8A:
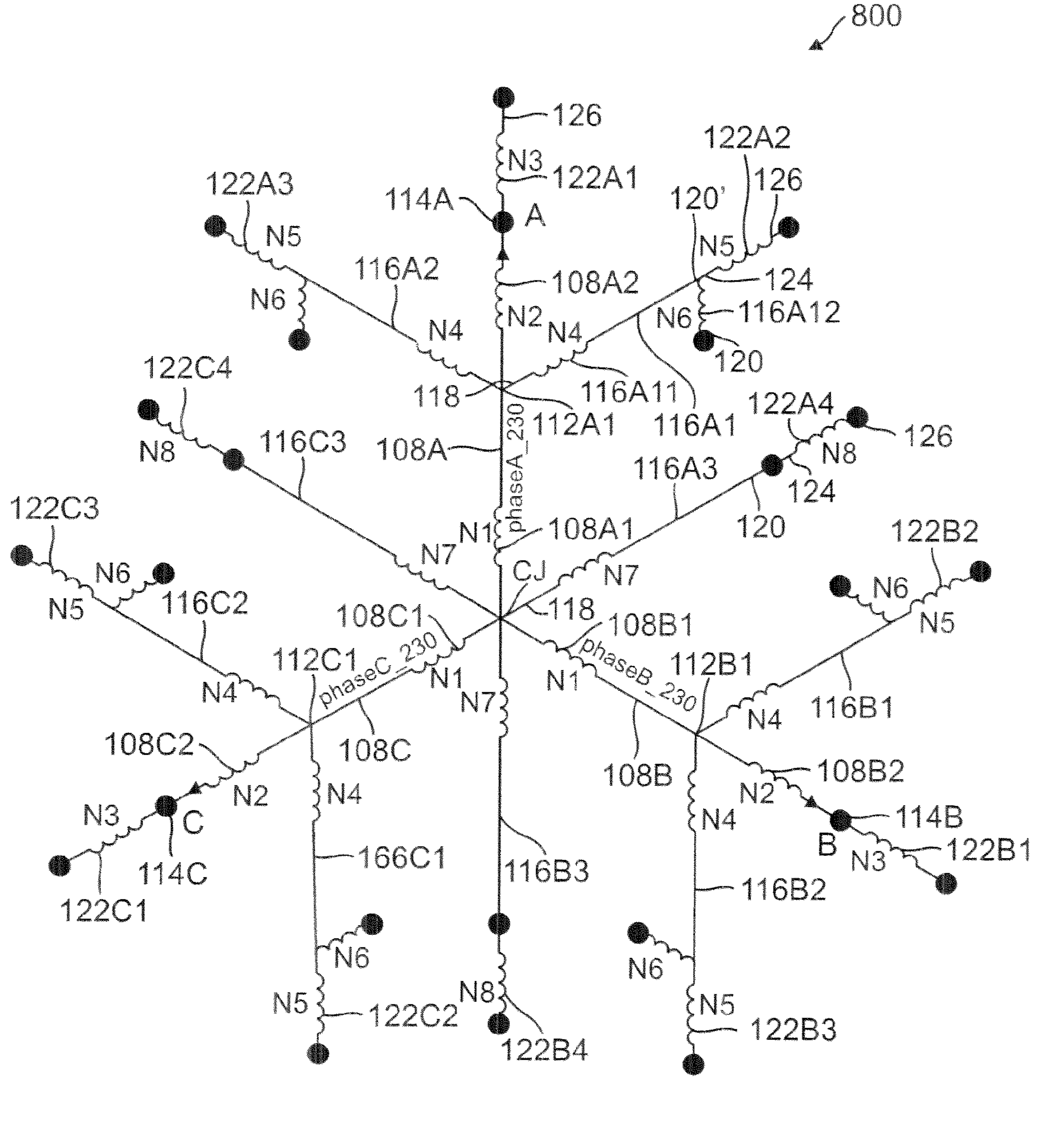
FIG. 8A is a winding diagram for an alternate multi-phase auto-transformer.
Figure 8B:
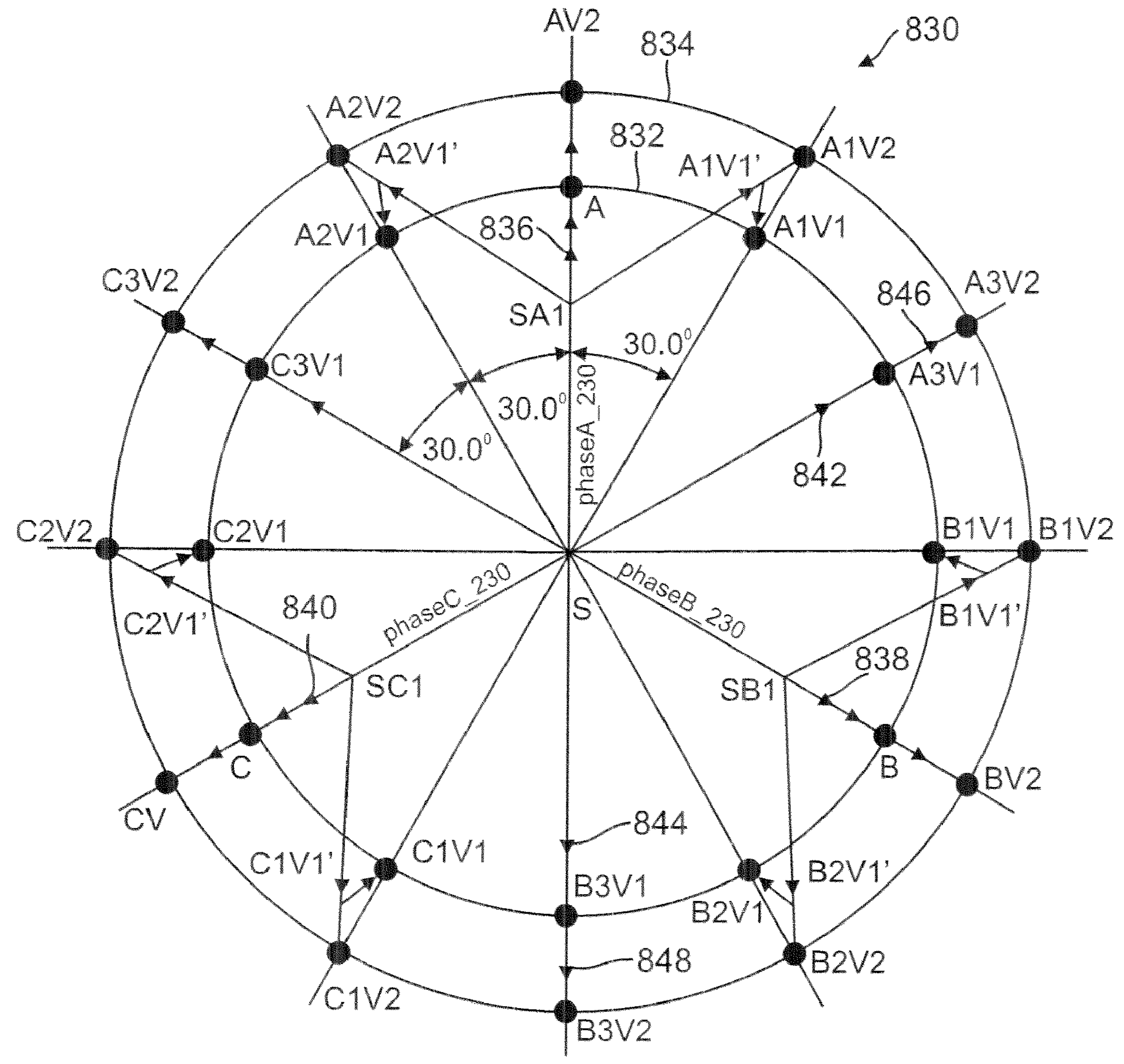
FIG. 8B is a phasor diagram for the multi-phase auto-transformer of FIG. 8A.

Another embodiment of a multi-phase transformer is now described with respect to FIGS. 8A and 8B. Transformer 800 is an example of a twelve-phase or twenty four-pulse multi-phase transformer. Transformer 800 is similar to the multi-phase transformer 700 described above with respect to FIGS. 7A and 7B. One difference between the two transformers is that in transformer 800 some of the secondary windings are couple to an interior junction of the primary winding.

Referring to FIG. 8A, the construction of the primary windings 108A-108C of transformer 800 is similar to the construction of the primary windings 108A-108C of transformer 700. Construction of the secondary windings and coupling of secondary windings and third windings will now be described.

The second group of windings 104 may include a plurality of secondary windings 116A1-116A3, 116B1-116B3 and 116C1-116C3. Each secondary winding, for example, secondary winding 116A1-116C2 includes a first end 118 and second end 120.

The secondary windings 116A1-116A2, 116B1-116B2 and 116C1-116C2 include a plurality of sub-windings. Secondary winding will now be described in detail with respect to secondary winding 116A1.

The secondary winding 116A1 may include a first sub-winding 116A11 and a second sub-winding 116A12. One end of the first sub-winding 116A11 and second sub-winding 116A12 are coupled together to define a sub-junction 120'. The other end of first sub-winding 116A11 corresponds to the first end 118 of secondary winding 116A1. The other end of second sub-winding 116A12 corresponds to the second end 120 of secondary winding 116A1.

Each secondary winding 116A1-116C4 may be magnetically coupled to one of the primary windings 108A-108C. In one embodiment, sub-windings of a secondary winding may be magnetically coupled to different primary windings. The first end 118 of some of the secondary windings, for example, secondary winding 116A3 may be coupled to the common junction CJ. The first end 118 of some of the secondary windings may be coupled to the interior junction of a primary winding. For example, first end 118 of secondary winding 116A1 may be coupled to interior junction 112A1 of primary winding 108A.

The third group of windings 106 may include a plurality of third windings. For example, plurality of third windings 122A1-122A4, 122B1-122B4 and 122C1-122C4. Each third winding, for example 122A1-122C4 includes a first end 124 and a second end 126. Each third winding 122A1-122C4 may be magnetically coupled to one of the primary windings, for example, a primary winding 108A-108C.

In one embodiment, the first end 124 of some of the third windings may be coupled to a primary winding. For example, the first end 124 of third winding 122A1 may be coupled to second end 114A of primary winding 108A.

In one embodiment, the first end 124 of some of the third windings may be coupled to a sub-junction of a secondary winding. For example, the first end 124 of third winding 122A2 may be coupled to sub-junction 120' of secondary winding 116A1.

In one embodiment, the first end 124 of some of the third windings may be coupled to a second end of a secondary winding. For example, the first end 124 of third winding 122A4 may be coupled to second end 120 of secondary winding 116A3.

In one embodiment, a phase angle difference of the output voltage Vout2 at two adjacent second ends of third windings is substantially the same. For example, the phase angle difference of the output voltage Vout2 at second end 126 of two adjacent third windings 122A1-122A2 is substantially the same.

In one embodiment, the output voltage Vout2 at the second end of the third windings is substantially equal. For example, the output voltage Vout2 at the second end 126 of the third windings 122A1-122A4, 122B1-122B4 and 122C1-122C4 is substantially the same.

In one embodiment, the output voltage Vout1 at the second end of secondary windings and at the second end of the primary windings is substantially the same. For example, the output voltage Vout1 at the second end 120 of secondary windings 116A1-116A3, 116B1-116B3 and 116C1-116C3 and at the second end 114A-114C of the primary windings 108A-108C is substantially equal.

In one embodiment, the output voltage Vout2 is greater than output voltage Vout1.

FIG. 8A also shows an example of a number of turns (N1-N8) for various windings and sub-windings, with some of the windings or sub-windings having substantially the same number of turns. For example, sub primary windings 108A1, 108B1 and 108C1 each may have substantially the same number of turns, for example., N1. Similarly, secondary windings, for example, secondary windings 116A3, 116B3 and 116C3 each may have substantially the same number of turns, for example, N7. Similarly, third windings 122A2 and 122A3 each may have substantially the same number of turns, for example, N5.

FIG. 8B shows a phasor diagram 831 for the multi-phase transformer 800. The phasor diagram 830 may include a first circle 832 and a second circle 834, both having a common center S. With respect to the primary windings, the phasor diagram 830 is similar to the phasor diagram 730 described above with respect to transformer 700. For example, lines SA, SB and SC represent primary windings 108A, 108B and 108C respectively. Some of the differences with respect to the secondary windings and third windings will be described now.

Points SA1, SB1 and SC1 represent the interior junctions 112A1, 112B1 and 112C1 of primary windings 108A-108C respectively. Line S-SA1 represents the sub primary winding 108A1.

Points A1V1-A3V1, B1V1-B3V1 and C1V1-C3V1 represent the second ends 120 of the secondary windings 116A1-116A3, 116B1-116B3 and 116C1-116C3 respectively. Points A1V1', A2V1', B1V1', B2V1', C1V1' and C2V1' represent the sub-junction 120' of secondary windings 116A1, 116A2, 116B1, 116B2, 116C1 and 116C2 respectively. Similarly points AV2, A1V2, A2V2, A3V2; BV2, B1V2, B2V2, B3V2; and CV2, C1V2, C2V2 and C3V2 represent the second end 126 of the third windings 122A1-122A4, 122B1-122B4 and 122C1-122C4 respectively. Lines A-AV2, A1V1'-A1V2, A2V1'-A2V2 and A3V1-A3V2 represent third windings 122A1-122A4 respectively.

As previously discussed, a length of a line in a phasor diagram represents the number of turns for the windings. For example, the length of line S-SA1 represents a number of turns N1 for sub primary winding 108A1. Similarly, the length of line S-A3V1 represents number of turns N7 for secondary winding 116A2. The length of line A3V1-A3V2 represents the number of turns N8 for third winding 122A4.

The lines SA, SB and SC represent the input AC voltage Vin applied to the second ends A, B and C of the primary windings 108A-108C. As it is evident from the phasor diagram, a three phase input voltage Vin depicted as phaseA_230, phaseB_230 and phaseC_230 is applied, with each phase separated by about 120 degrees.

As previously described, the lines in a phasor diagrams are vector lines depicting a vector of the induced voltage. For example, the vector of the induced voltage in primary windings SA, SB and SC are depicted by the arrows 836, 838 and 840. Similarly, the arrows on lines representing the secondary windings and the third windings represent the vector of the induced voltage. For example, arrows 842 and 844 represent the vector of the induced voltage in the secondary windings 116A3 and 116B3 respectively. The arrows 846 and 848 represent the vector of induced voltage in the third winding 122A4 and 122B4 respectively.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same.

The phasor diagram 830 shows an example of a vector of the induced voltage in the primary windings, secondary windings and the third windings.

Figure 9A:
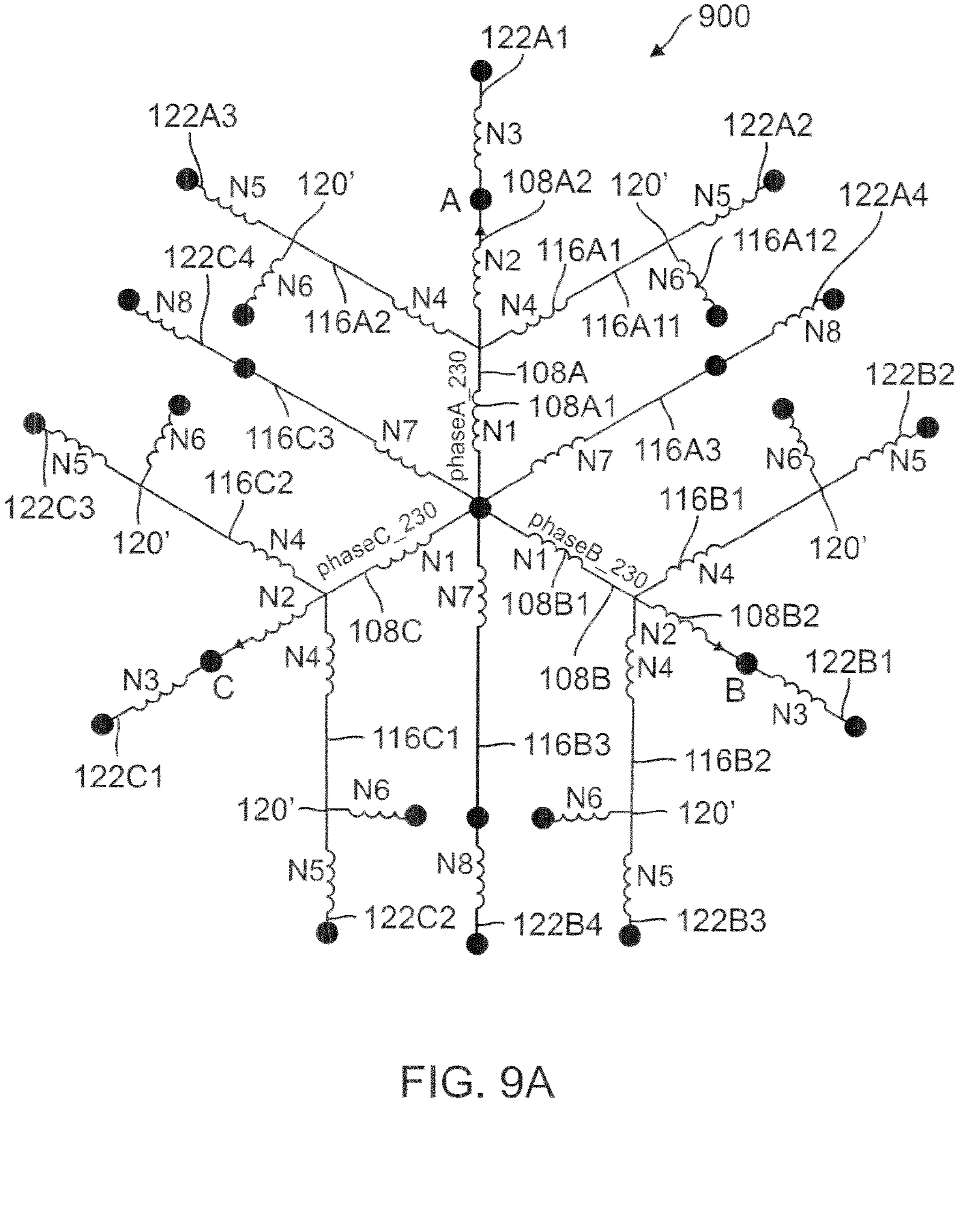
FIG. 9A is a winding diagram for an alternate multi-phase auto-transformer.
Figure 9B:
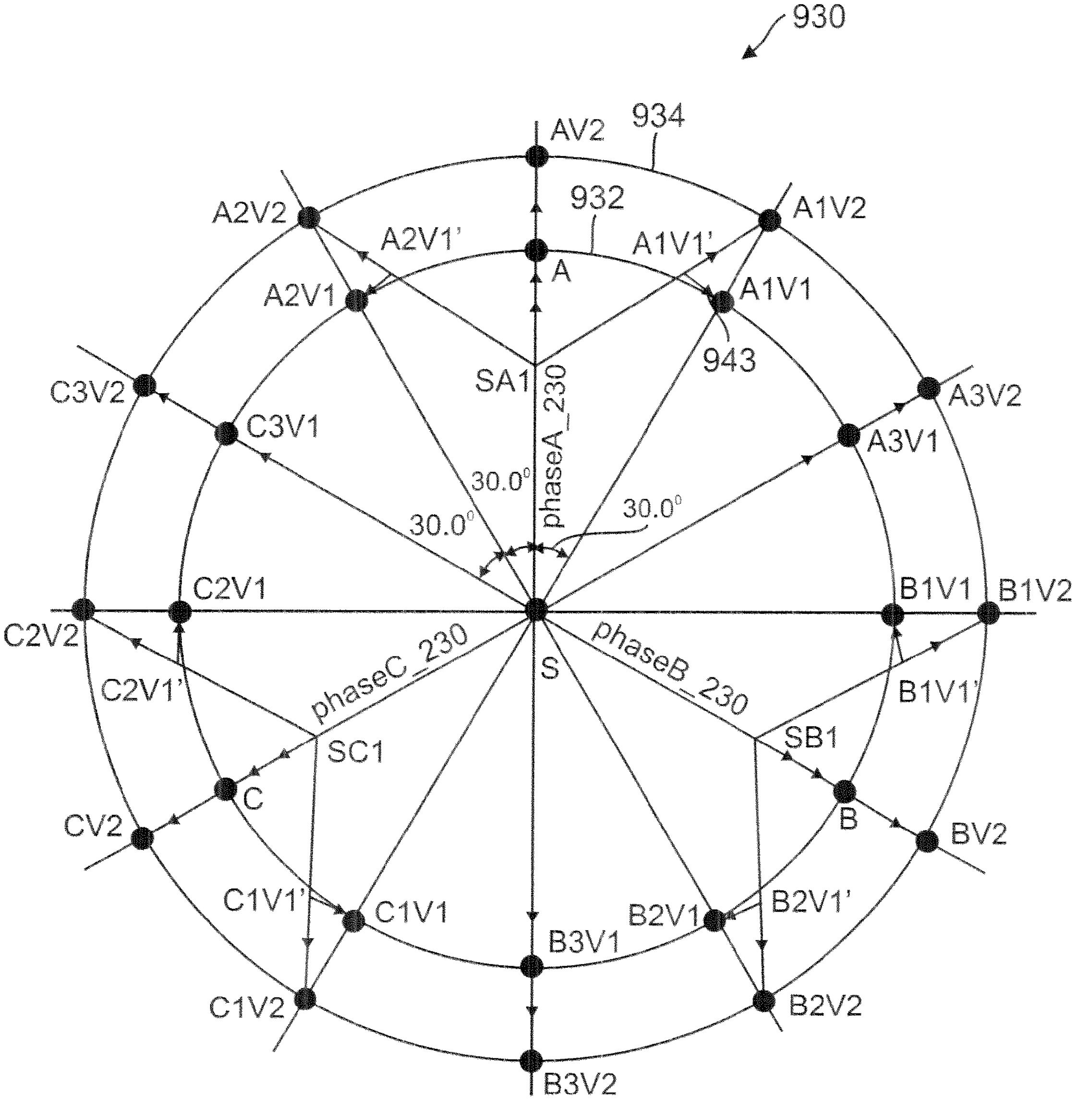
FIG. 9B is a phasor diagram for the multi-phase auto-transformer of FIG. 9A.

Another embodiment of a multi-phase transformer 900 is now described with respect to FIGS. 9A and 9B. Transformer 900 is yet another example of a twelve phase or twenty four pulse multi-phase transformer. The multi-phase transformer 900 is similar to the multi-phase transformer 800 described above with respect to FIGS. 8A and 8B. One difference being that in transformer 900, the second sub-windings of some of the secondary windings may be magnetically coupled to a different primary winding than that shown with respect to transformer 800.

Similarity in the construction of the transformer 900 with respect to transformer 800 may he understood by referring to FIGS. 9A and 9B and the description of transformer 800 provided herein above. For example, points A1V1', A2V1', B1V1', B2V1', C1V1' and C2V1' represent the sub-junction 120' of secondary windings 116A1, 116A2, 116B1, 116B2, 116C1 and 116C2 respectively.

One difference between transformer 900 and transformer 800 will now be described with respect to the phasor diagram 930 as shown in FIG. 9B. In phasor diagram 930, points A1V1', A2V1', B1V1', B2V1', C1V1' and C2V1' represent the sub-junction 120' of secondary windings 116A1, 116A2, 116B1, 116B2, 116C1 and 116C2 respectively. Line A1V1'-A1V1 represents the second sub-winding 116A12.

As previously described, the lines in a phasor diagrams are vector lines depicting a vector of the induced voltage and arrows represent the vector of the induced voltage. As it is evident from the phasor diagram 930, the arrow 943 on line A1V1'-A1V1 represents the vector of the induced voltage in the second sub-winding 116A12.

As the line A1V1'-A1V1 is parallel to line SB, which represents primary winding 108B, the second sub-winding may be magnetically coupled to primary winding 108B. Further, as the direction of the arrow on line SB is the same as the direction of arrow on line A1V1'-A1V1, the vector of the induced voltage in second sub-winding 116A12 is in phase with the vector of the induced voltage in primary winding 108B.

Now, comparing the vector of the induced voltage in the second sub-winding 116A2 of transformer 800 as shown in FIG. 8A, it is evident that the second sub-winding 116A2 of transformer 800 may be magnetically coupled to a different primary winding, for example, primary winding 108A, as depicted by line SA. Further, the vector of the induced voltage in the second sub-winding 116A2 of transformer 800 is about 180 degrees out of phase with the vector of the induced voltage in the primary winding 108A.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same.

The phasor diagram 930 shows an example of a vector of the induced voltage in the primary windings, secondary windings and the third windings.

Figure 10A:
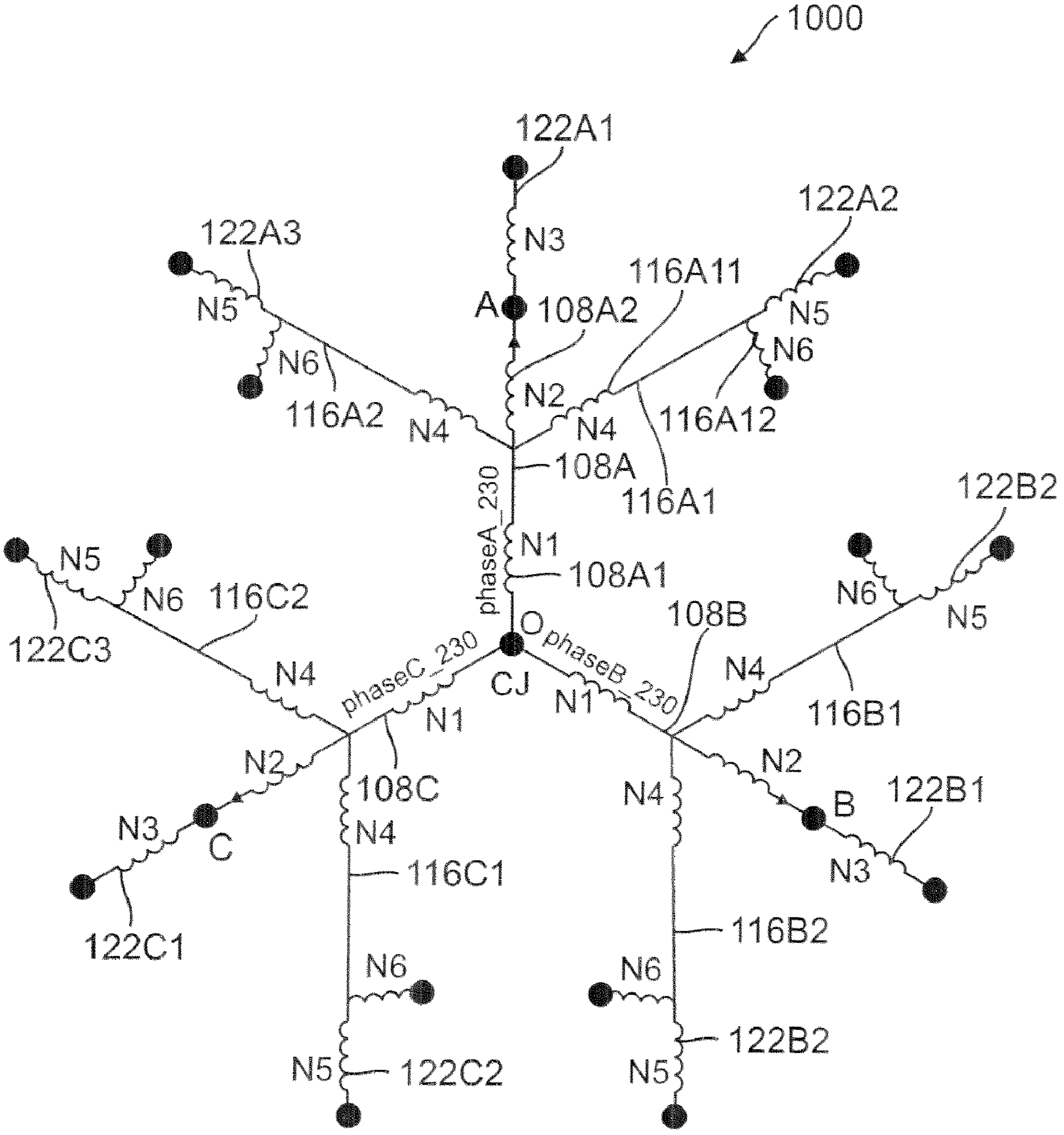
FIG. 10A is a winding diagram for an alternate multi-phase auto-transformer.
Figure 10B:
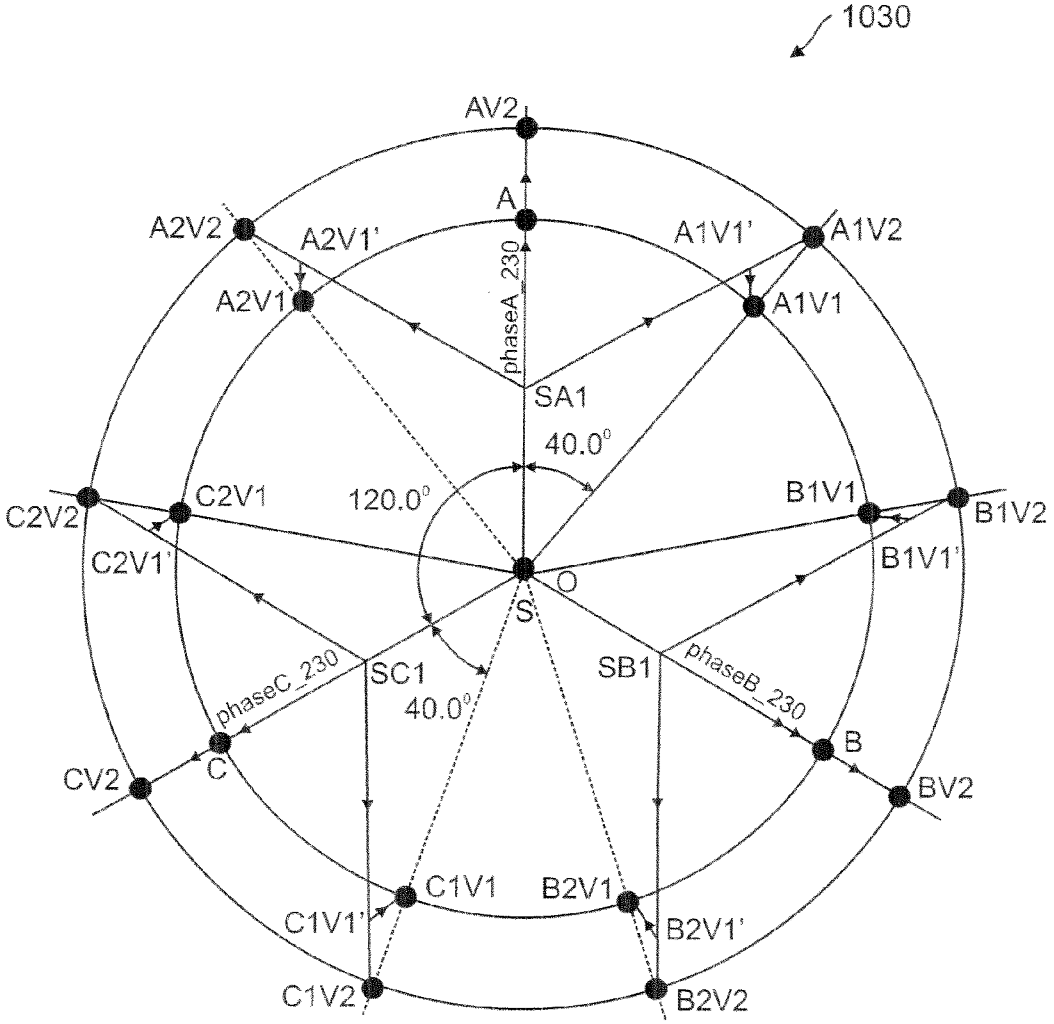
FIG. 10B is a phasor diagram for the multi-phase auto-transformer of FIG. 10A.

Another embodiment of a multi-phase transformer is now described with respect to FIGS. 10A and 10B. Transformer 1000 is yet another example of a nine-phase or eighteen-pulse multi-phase transformer. The multi-phase transformer 1000 is similar to the multi-phase transformer 800 described above with respect to FIGS. 8A and 8B. One difference being that transformer 1000 does not have some of the secondary windings coupled to the common junction.

Similarity in the construction of transformer 1000 with respect to transformer 800 may be understood by referring to FIGS. 10A and 10B and the description of transformer 800 provided above. Some of the similarities and differences are described below.

Transformer 1000 includes a plurality of secondary windings 116A1, 116A2, 116B1, 116B2, 116C1 and 116C2. Unlike transformer 800, transformer 1000 does not have secondary windings 116A3, 116B3 and 116C3, first end 118 of which were coupled to the common junction in transformer 800. In addition, transformer 1000 does not have third windings 122A4, 122B4 and 122C4. Transformer 1000 includes nine second ends of third windings and six second ends of secondary windings.

The phasor diagram 1030 of transformer 1000 shown in FIG. 10B is substantially similar to the phasor diagram 830 of transformer 800. However, as one skilled in the art appreciates, the phasor diagram 1030 depicts a nine phase or 18 pulse transformer and the phasor diagram 830 is depicts a twelve phase or twenty four pulse transformer. Hence, the phase angle difference of an output voltage at two adjacent second ends of the third windings of transformer 1001 will be different than transformer 800.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same.

The phasor diagram 1030 shows an example of a vector of the induced voltage in the primary windings, secondary windings and the third windings.

Figure 11A:
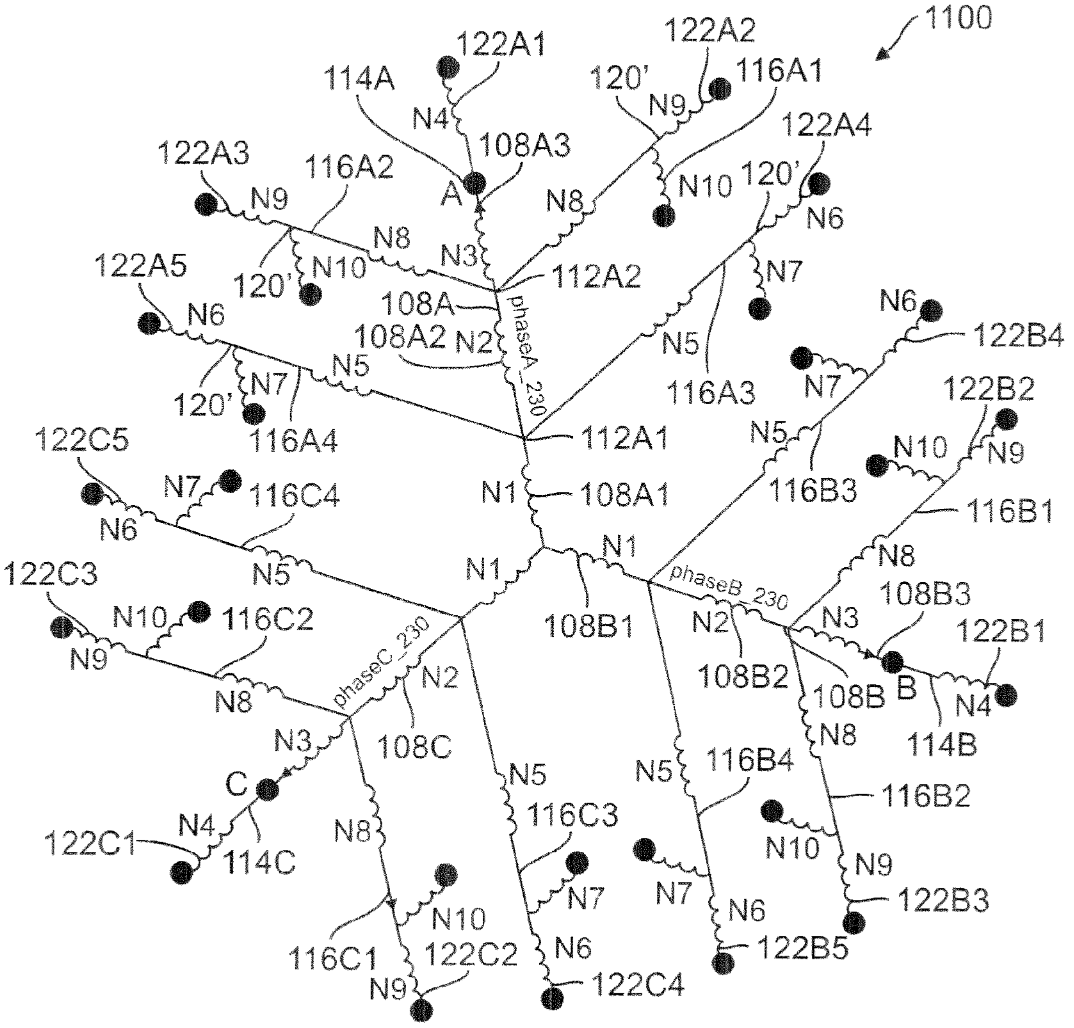
FIG. 11A is a winding diagram for an alternate multi-phase auto-transformer.
Figure 11B:
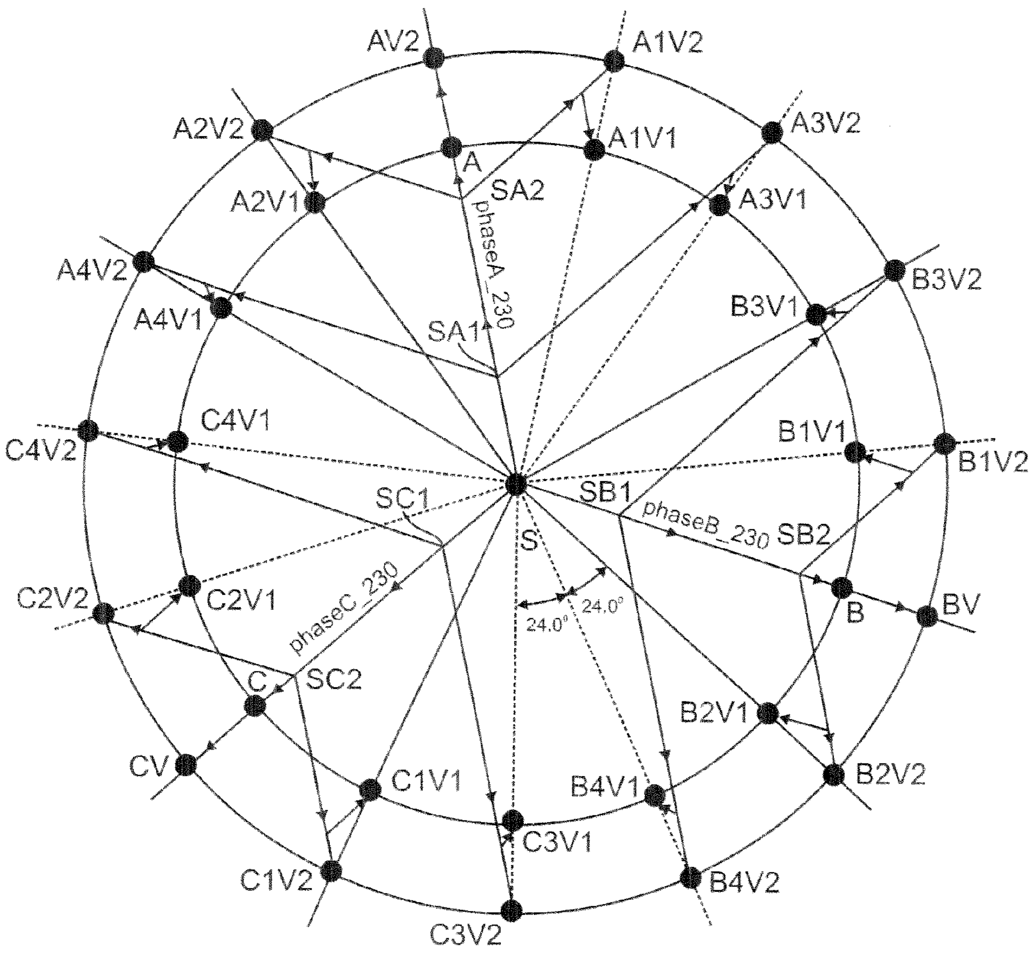
FIG. 11B is a phasor diagram for the multi-phase auto-transformer of FIG. 11A.

Another embodiment of a multi-phase transformer is described with respect to FIGS. 11A and 11B. Transformer 1100 is an example of a fifteen phase or thirty pulse multi-phase transformer. The multi-phase transformer 1100 is similar to the multi-phase transformer 1000 described with respect to FIGS. 10A and 10B in that multi-phase transformer 1000 has a primary group of windings 102, secondary group of windings 104 and third group of windings 106. One difference being that the transformer 1100 may include an additional sub primary winding in the primary windings, providing an additional interior junction. Furthermore, in transformer 1100, additional secondary windings are coupled to additional interior junctions of the primary windings.

Similarity in the construction of transformer 1100 with respect to transformer 1000 may be understood by referring to FIGS. 11A and 11B and description of transformer 1000 provided above. Some of the similarities and differences are described below.

In transformer 1100, each of the primary windings 108A-108C includes a plurality of sub windings 108A1-108A3, 108B1-108B3, 108C1-108C3. The sub windings are coupled in series to form interior junctions. For example, the primary winding 108A includes interior junctions 112A1, 112A2 and 112A3. Similarly, primary winding 108B includes interior junctions 112B1-112B3 and primary winding 108C include interior junctions 112C1-112C3.

Transformer 1100 includes a plurality of secondary windings 116A1, 116A2, 116A3, 116A4; 116B1, 116B2, 116B3, 116B4; 116C1, 116C2, 116C3 and 116C4. In addition, the transformer 1100 has additional third windings 122A4, 122A5, 122B4, 122B5, 122C4 and 122C5. So, the transformer 1100 includes fifteen second ends of third windings and twelve second ends of secondary windings.

Similar to transformer 1000, the first end of secondary windings may be coupled to an interior junction of a primary winding. For example, the first end 118 of secondary winding 116A1 may be coupled to the interior junction 112A2 of primary winding 108A.

Similar to transformer 1000, the first ends of the third windings are either coupled to the second end of primary windings or to a sub-junction of secondary windings. For example, the first end 124 of third winding 122A1 may be coupled to the second end 114A of primary winding 108A. The first end 124 of third winding 122A2 may be coupled to the sub-junction 120' of secondary winding 116A1.

The phasor diagram 1130 of transformer 1100 is substantially similar to the phasor diagram 1030 of transformer 1000. However, as one skilled in the art appreciates, the phasor diagram 1130 depicts a fifteen phase or thirty pulse transformer and the phasor diagram 1030 depicts a nine phase or eighteen pulse transformer. Hence, a phase angle difference of the output voltage at two adjacent second ends of the third windings of transformer 1100 will be different than transformer 1000.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same.

The phasor diagram 1130 shows an example of a vector of the induced voltage in the primary windings, secondary windings and the third windings.

Figure 12A:
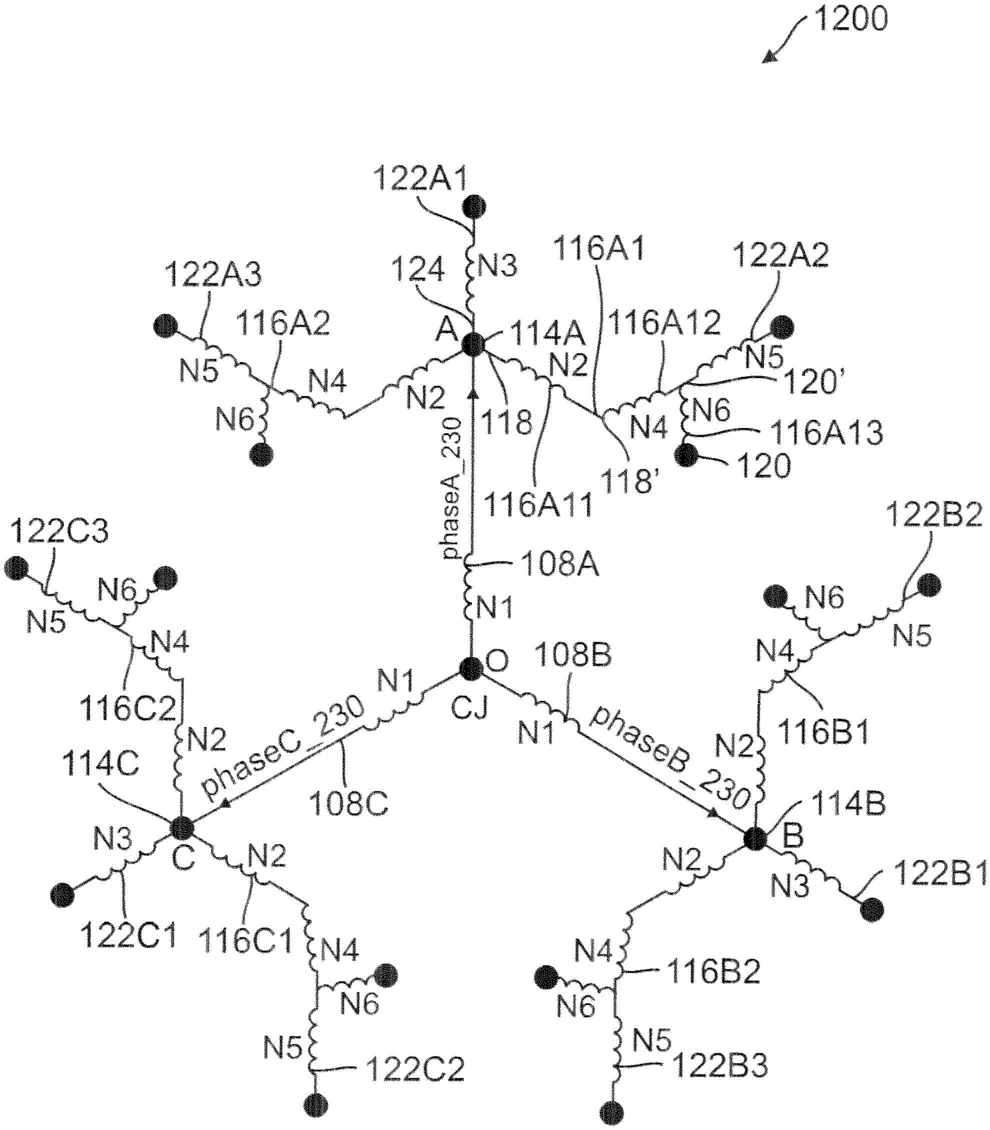
FIG. 12A is a winding diagram for an alternate multi-phase auto-transformer.
Figure 12B:
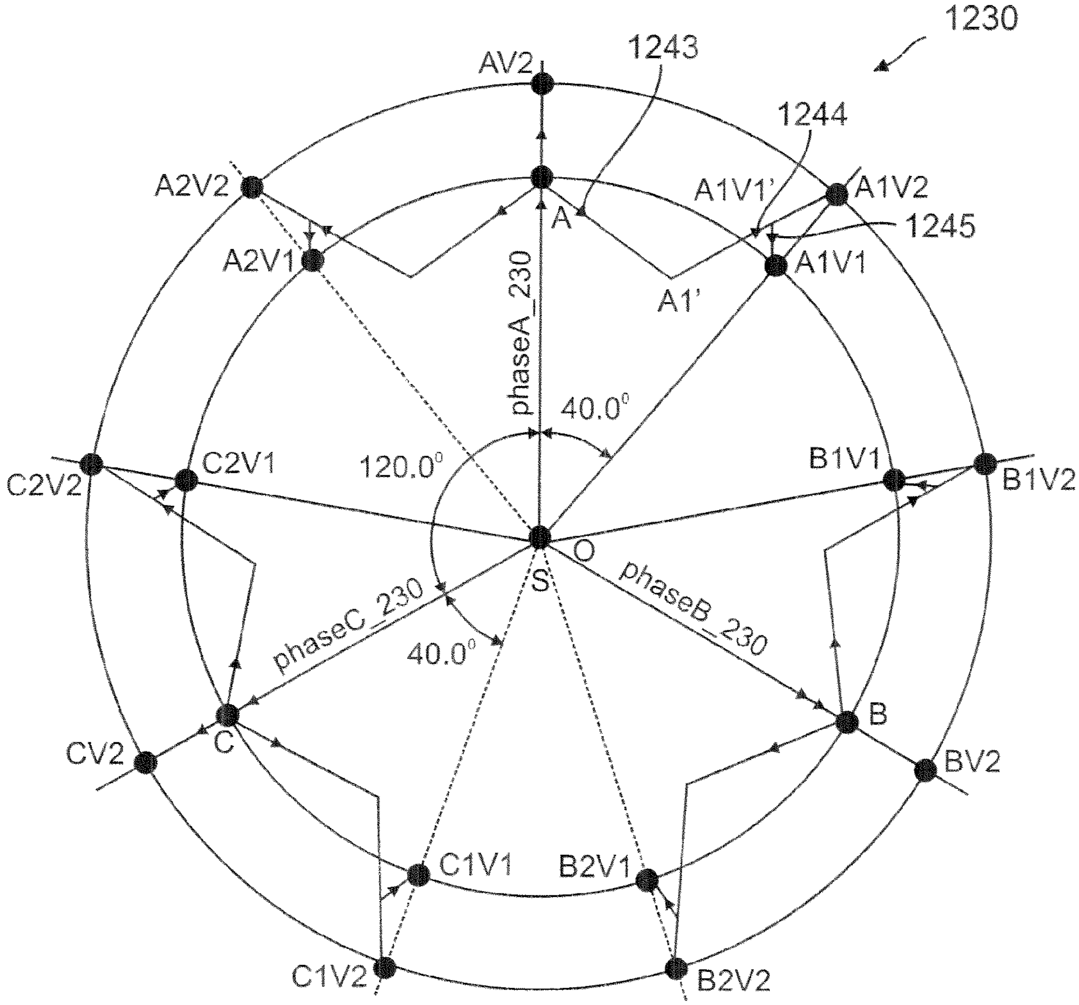
FIG. 12B is a phasor diagram for the multi-phase auto-transformer of FIG. 12A.

Another embodiment of a multi-phase transformer is now described with respect to FIGS. 12A and 12B. Transformer 1200 is an example of a nine phase or eighteen pulse multi-phase transformer. The multi-phase transformer 1200 is similar to the multi-phase transformer 1000 described above with respect to FIGS. 10A and 10B in that multi-phase transformer 1000 has a primary group of windings 102, secondary group of windings 104 and third group of windings 106.

One difference between transformer 1000 and transformer 1200 is that transformer 1200 may be constructed with primary windings with or without sub primary windings. In one embodiment, the secondary windings are coupled to the second ends of the primary windings.

Similarity in the construction of the transformer 1200 with respect to transformer 1000 may be understood by referring to FIGS. 12A and 12B and description of transformer 1000 provided above. Some of the similarities and differences are described below.

Transformer 1200 may include a plurality of primary windings 108A-108C, with a first end of each primary winding coupled together to form a common junction and a second end 114A-114C respectively. Transformer 1200 includes a plurality of secondary windings 116A1, 116A2; 116B1, 116B2; 116C1 and 116C2. Each of the plurality of secondary windings includes a first sub-winding and a plurality of second sub-windings. Secondary winding will now be described in detail with respect to secondary winding 116A1.

The secondary winding 116A1 may include a first sub-winding 116A11 and a plurality of second sub-windings 116A12 and 116A13. One end of the first sub-winding 116A11 and second sub-winding 116A12 are coupled together to define a sub-junction 118'. The other end of first sub-winding 116A11 corresponds to the first end 118 of secondary winding 116A1. The other end of second sub-winding 116A12 may be coupled to an end of another second sub-winding 116A13 to form a sub-junction 120'. The other end of second sub-winding 116A13 corresponds to the second end 120 of secondary winding 116A1.

Each secondary winding 116A1-116C2 may be magnetically coupled to one of the primary windings 108A-108C. In one embodiment, sub-windings of a secondary winding may be magnetically coupled to different primary windings.

In one embodiment, the first end 118 of the secondary windings is coupled to the second end of a primary winding. For example, first end 118 of secondary winding 116A1 may be coupled to the second end 114A of primary winding 108A.

The transformer 1200 includes a plurality of third windings 122A1-122A3; 122B1-122B3; and 122C1-122C3.

Similar to transformer 1000, the first end of the third windings is either coupled to the second end of primary windings or to a sub-junction of secondary windings. For example, the first end 124 of third winding 122A1 may be coupled to the second end 114A of primary winding 108A. The first end 124 of third winding 122A2 may be coupled to the sub-junction 120' of secondary winding 116A1.

The phasor diagram 1230 (FIG. 12B) of transformer 120 may be understood based upon the teachings of other phasor diagrams disclosed herein, for example, phasor diagram 1030 disclosed with respect to FIG. 10B. Point A1' in phasor diagram 1230 represents the sub-junction 118' of secondary winding 116A1. Similarly, point A1V1' represents the sub-junction 120' of secondary winding 116A1.

However, as one skilled in the art can appreciate, in the phasor diagram 1230, a vector of the induced voltage in some of the sub-windings of secondary windings are different than the vector of the induced voltage shown with respect to phasor diagram 1030. For example, with respect to the secondary winding 116A1, the first sub-winding 116A11 is represented by line A-A1', the second sub-winding 116A12 is represented by line A1'-A1V1' and the second sub-winding 116A13 is represented by line A1V1'-A1V1. The arrow 1243 on line A-A1', arrow 1244 on line A1'-A1V1' and arrow 1245 on line A1V1'-A1V1 each represent the vector of the induced voltage in the first sub-winding 116A11, second sub-winding 116A12 and second sub-winding 116A13 respectively.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same.

The phasor diagram 1230 shows an example of a vector of the induced voltage in the primary windings, secondary winnings and the third windings.

Figure 13A:
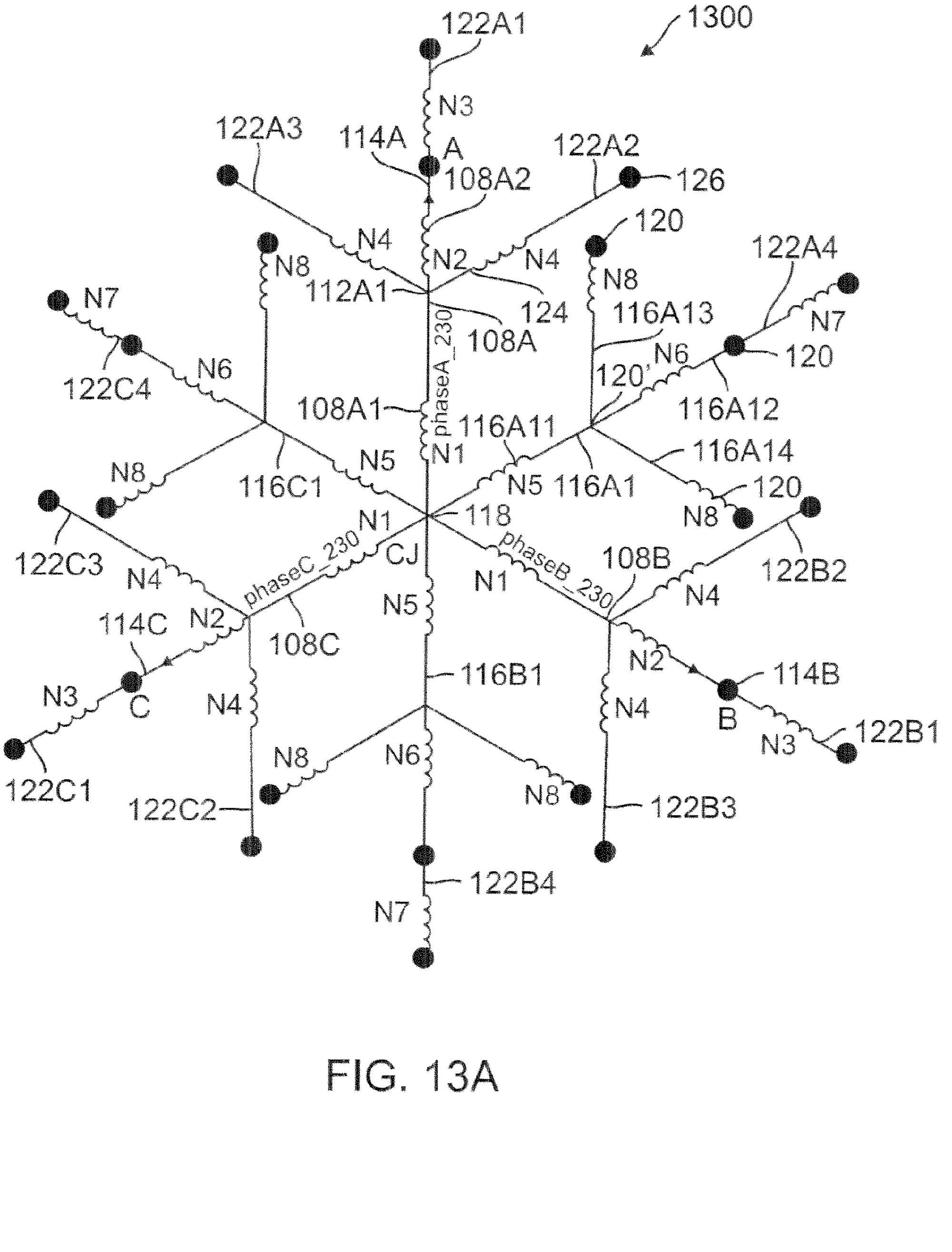
FIG. 13A is a winding diagram for an alternate multi-phase auto-transformer.
Figure 13B:
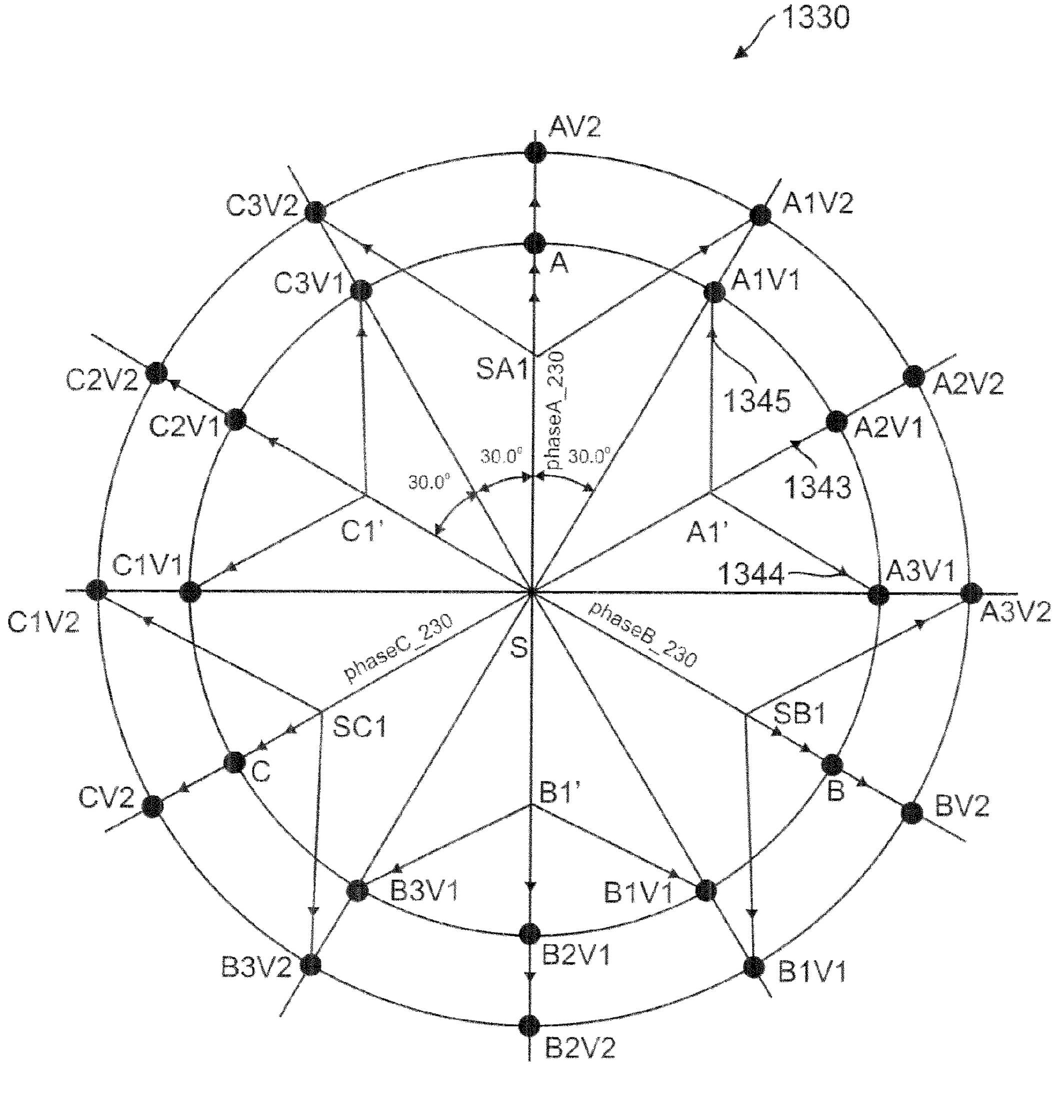
FIG. 13B is a phasor diagram for the multi-phase auto-transformer of FIG. 13A.

Another embodiment of a multi-phase transformer is now described with respect to FIGS. 13A and 13B. Transformer 1300 is an example of a twelve phase or twenty four pulse multi-phase transformer. The multi-phase transformer 1300 is similar to the multi-phase transformer 500 described above with respect to FIGS. 5A and 5B.

One of the differences between transformer 500 and transformer 1300 is that transformer 1300 is constructed with primary windings with sub primary windings. One of the similarities is that both transformer 500 and transformer 1300 may have some secondary windings with more than one second end.

Similarity in the construction of transformer 1300 with respect to transformer 500 may be understood by referring to FIGS. 13A and 13B and description of transformer 500 provided herein above. Some of the similarities and differences are described below.

Transformer 1300 may include a plurality of primary windings 108A-108C, with a first end of each primary winding coupled together to form a common junction and a second end 114A-114C respectively. Each of the primary windings includes a plurality of sub primary windings that are coupled in series at one or more interior junctions. For example, primary winding 108A may include sub primary windings 108A1 and 108A2, coupled in series at interior junction 112A1. Primary windings 108B and 108C are similarly constructed.

Transformer 1300 includes a plurality of secondary windings 116A1, 116B1 and 116C1. Each of the plurality of secondary windings includes a first sub-winding and a plurality of second sub-windings. Secondary winding will now be described in detail with respect to secondary winding 116A1.

The secondary winding 116A1 may include a first sub-winding 116A11 and a plurality of second sub-windings 116A12, 116A13 and 116A14. One end of the first sub-winding 116A11 and second sub-windings 116A12, 116A12 and 116A13 are coupled together to define a sub-junction 120'. The other end of first sub-winding 116A11 corresponds to the first end 118 of secondary winding 116A1. The other end of second sub-windings 116A12, 116A13 and 113A14 correspond to a plurality of second end 120 of secondary winding 116A1.

Each secondary winding 116A1-116C1 may be magnetically coupled to one of the primary windings 108A-108C. In one embodiment, sub-windings of a secondary winding may be magnetically coupled to different primary windings.

In one embodiment, the first end 118 of the secondary windings is coupled to the common junction of primary windings. For example, the first end 118 of secondary winding 116A1 may be coupled to the common junction CJ.

The transformer 1300 includes a plurality of third windings 122A1-122A4; 122B1-122B4; and 122C1-122C4.

The first end of the third windings is coupled to one of the second end of a primary winding, interior junction of a primary winding or to a second end of a secondary winding. For example, the first end 124 of third winding 122A1 may be coupled to the second end 114A of primary winding 108A. The first end 124 of third winding 122A2 may be coupled to the interior junction 112A1 of primary winding 108A. The first end 124 of third winding 122A4 may be coupled to the second end 120 of secondary winding 116A1.

The phasor diagram 1330 (FIG. 13B) of transformer 1300 may be understood based upon the teachings of other phasor diagrams disclosed herein, for example, phasor diagram 530 described above with respect to FIG. 5B. For example, point A1' in phasor diagram 1330 represents the sub-junction 120' of secondary winding 116A1.

However, as one skilled in the art can appreciate that in the phasor diagram 1330, the vector of the induced voltage in some of the sub-windings of secondary windings are different than the vector of the induced voltage shown with respect to phasor diagram 530. For example, with respect to the secondary winding 116A1, the first sub-winding 116A11 is represented by line S-A1', the second sub-winding 116A12 is represented by line A1'-A2V1, the second sub-winding 116A13 is represented by line A1'-A1V1 and the second sub-winding 116A14 is represented by line A1'-A3V1. The arrow 1343 on line A1'-A2V1, arrow 1344 on line A1'-A1V1 and arrow 1345 on line A1'-A3V1 each represent the vector of the induced voltage in the second sub-winding 116A12, second sub-winding 116A13 and second sub-winding 116A14 respectively.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same.

The phasor diagram 1330 shows an example of a vector of the induced voltage in the primary windings, secondary windings and the third windings.

Figure 14A:
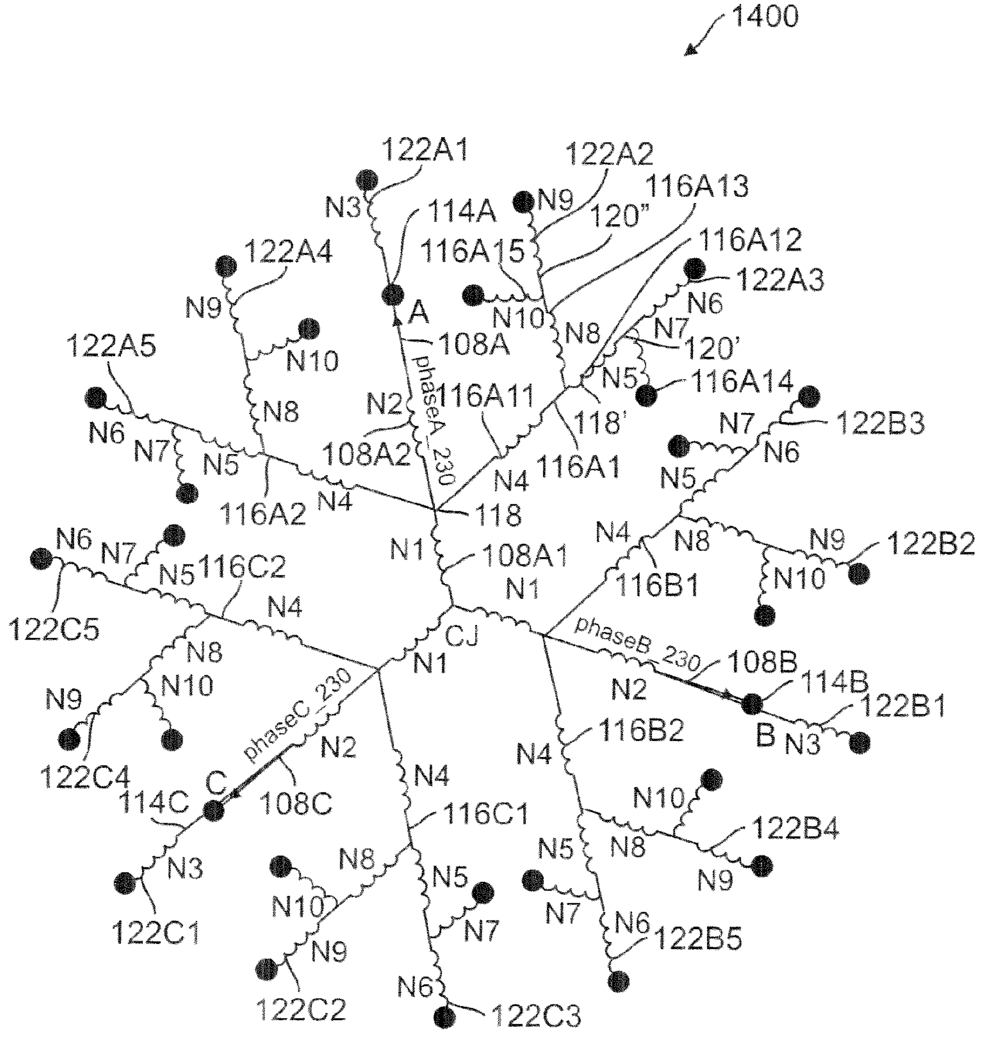
FIG. 14A is a winding diagram for an alternate multi-phase auto-transformer.
Figure 14B:
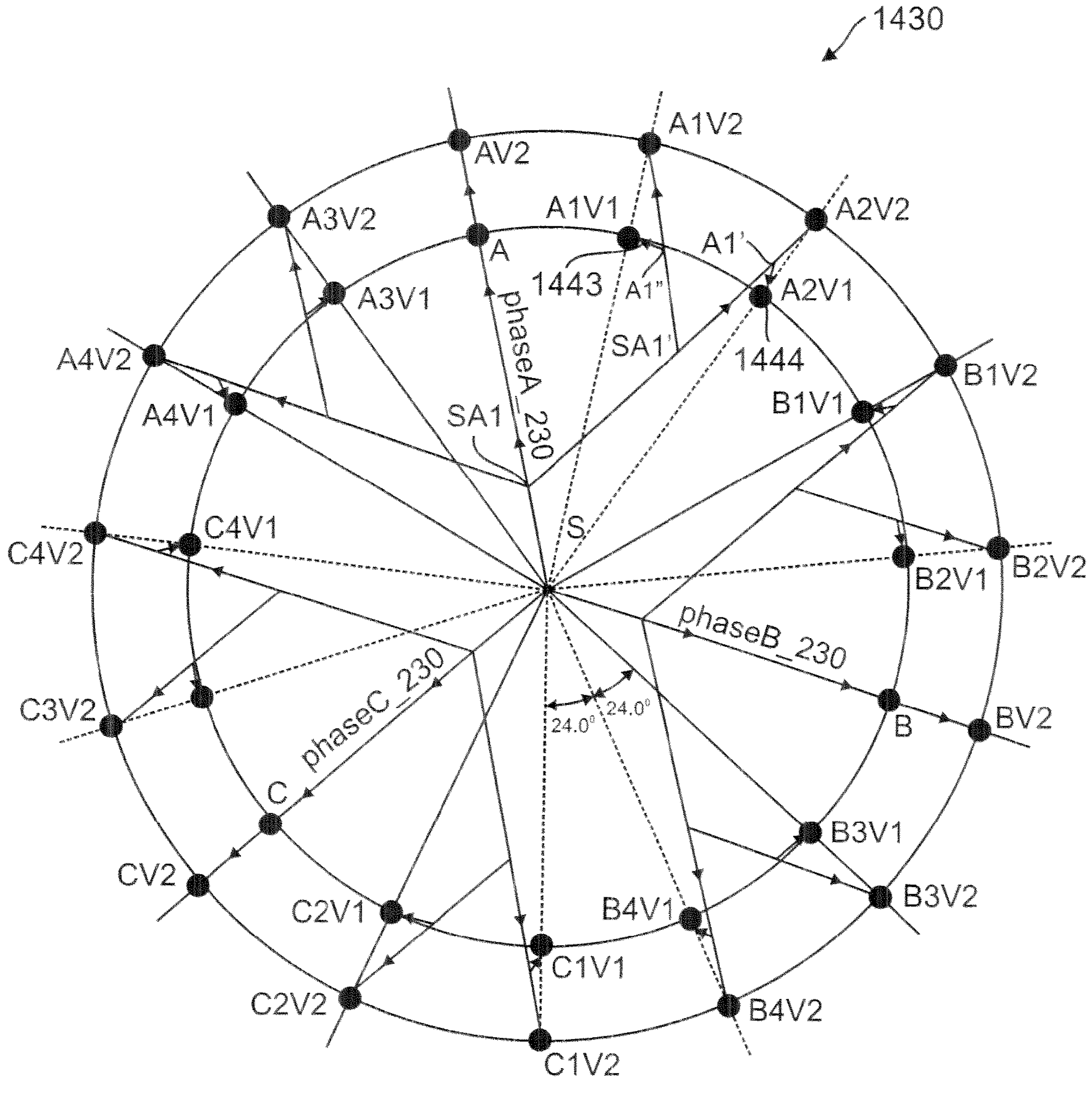
FIG. 14B is a phasor diagram for the multi-phase auto-transformer of FIG. 14A.

Another embodiment of a multi-phase transformer is now described with respect to FIGS. 14A and 14B. Transformer 1400 is an example of a fifteen phase or thirty pulse multi-phase transformer. The multi-phase transformer 1400 is similar to the multi-phase transformer 500 described with respect to FIGS. 5A and 5B.

One of the differences between transformer 500 and transformer 1400 is that the transformer 1300 is constructed with primary windings with sub primary windings. One of the similarities is that the transformer 500 and transformer 1400 both may have some secondary windings with more than one second end.

Similarity in the construction of the transformer 1400 with respect to transformer 500 may be understood by referring to FIGS. 14A and 14B and description of transformer 500 provided herein above. Some of the similarities and differences are described below.

Transformer 1400 may include a plurality of primary windings 108A-108C, with a first end of each primary winding coupled together to form a common junction CJ and a second end 114A-114C respectively. Each of the primary windings may include a plurality of sub primary windings that are coupled in series at one or more interior junctions. For example, primary winding 108A may include sub primary windings 108A1 and 108A2, coupled in series at interior junction 112A1. Primary windings 108B and 108C are similarly constructed.

Transformer 1400 includes a plurality of secondary windings 116A1-116A2, 116B1-116B2, 116C1-116C2. Each of the plurality of secondary windings includes a first sub-winding and a plurality of second sub-windings. Secondary winding will now be described in detail with respect to secondary winding 116A1.

The secondary winding 116A1 may include a first sub-winding 116A11 and a plurality of second sub-windings 116A12, 116A13, 116A14 and 116A15. One end of the first sub-winding 116A11, second sub-winding 116A12 and second sub-winding 116A13 are coupled together to define a sub-junction 118'. The other end of first sub-winding 116A11 corresponds to the first end 118 of secondary winding 116A1. The other end of second sub-winding 116A12 may be coupled to an end of another second sub-winding 116A14 at sub-junction 121'. The other end second sub-winding 116A14 corresponds to a second end 120 of secondary winding 116A2. The other end of second sub-winding 116A13 may be coupled to an end of another second sub-winding 116A15 at sub-junction 120". The other end of second sub-winding 116A15 corresponds to another second end 120 of secondary winding 116A2.

Each secondary winding 116A1-116C2 may be magnetically coupled to one of the primary windings 108A-108C. In one embodiment, sub-windings of a secondary winding may be magnetically coupled to different primary windings.

In one embodiment, the first end 118 of the secondary windings may be coupled to the interior junction of a primary winding. For example, first end 118 of secondary winding 116A1 may be coupled to the interior junction 112A1.

Transformer 1400 includes a plurality of third windings 122A1-122A5; 122B1-122B5; and 122C1-122C5. The first end of the third windings is coupled to one of the second end of a primary winding or to a sub-junction of a secondary winding. For example, the first end 124 of third winding 122A1 may be coupled to the second end 114A of primary winding 108A. The first end 124 of third winding 122A2 may be coupled to the sub-junction 120" of secondary winding 116A1. The first end 124 of third winding 122A3 may be coupled to the sub-junction 120' of secondary winding 116A1.

The phasor diagram 1430 (FIG. 14B) of transformer 1400 may be understood based upon the teachings of other phasor diagrams disclosed herein, for example, phasor diagram 530 disclosed with respect to FIG. 5B. For example, point A1' in phasor diagram 1430 represents the sub-junction 120' of secondary winding 116A1. Similarly, point A1" in phasor diagram 1430 represents the sub-junction 120" of secondary winding 116A1.

However, as one skilled in the art can appreciate, in the phasor diagram 1430, the vector of the induced voltage in some of the sub-windings of secondary windings is different than the vector of the induced voltage shown with respect to phasor diagram 530. For example, with respect to the secondary winding 116A1, the first sub-winding 116A11 is represented by line SA1-SA1', the second sub-winding 116A12 is represented by line SA1'-A1', the second sub-winding 116A13 is represented by line SA1'-A1", the second sub-winding 116A14 is represented by line A1'-A2V1 and the second sub-winding 116A15 is represented by line A1"-A1V1. For example, the arrow 1443 on line A1"-A1V1 and arrow 1444 on line A1'-A2V1 each represent the vector of the induced voltage in the second sub-winding 116A15 and second sub-winding 116A14 respectively.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same.

The phasor diagram 1430 shows an example of a vector of the induced voltage in the primary windings, secondary windings and the third windings.

Figure 15A:
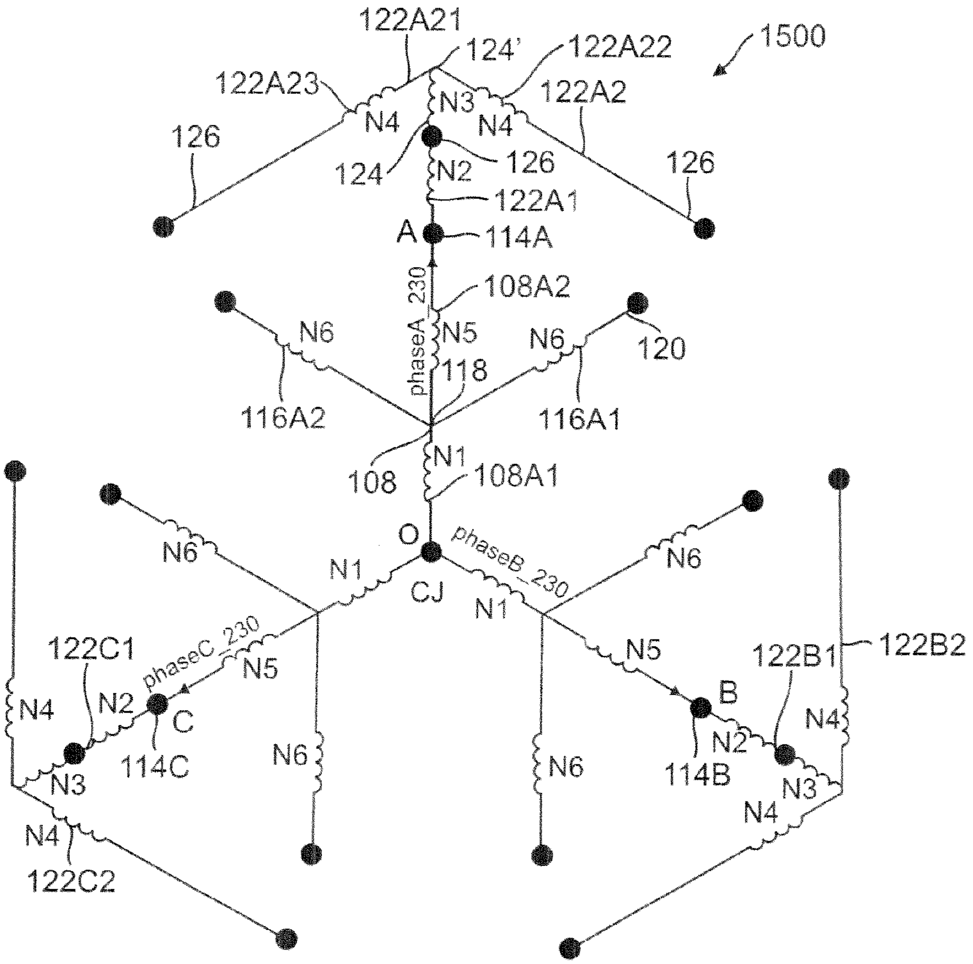
FIG. 15A is a winding diagram for an alternate multi-phase auto-transformer.
Figure 15B:
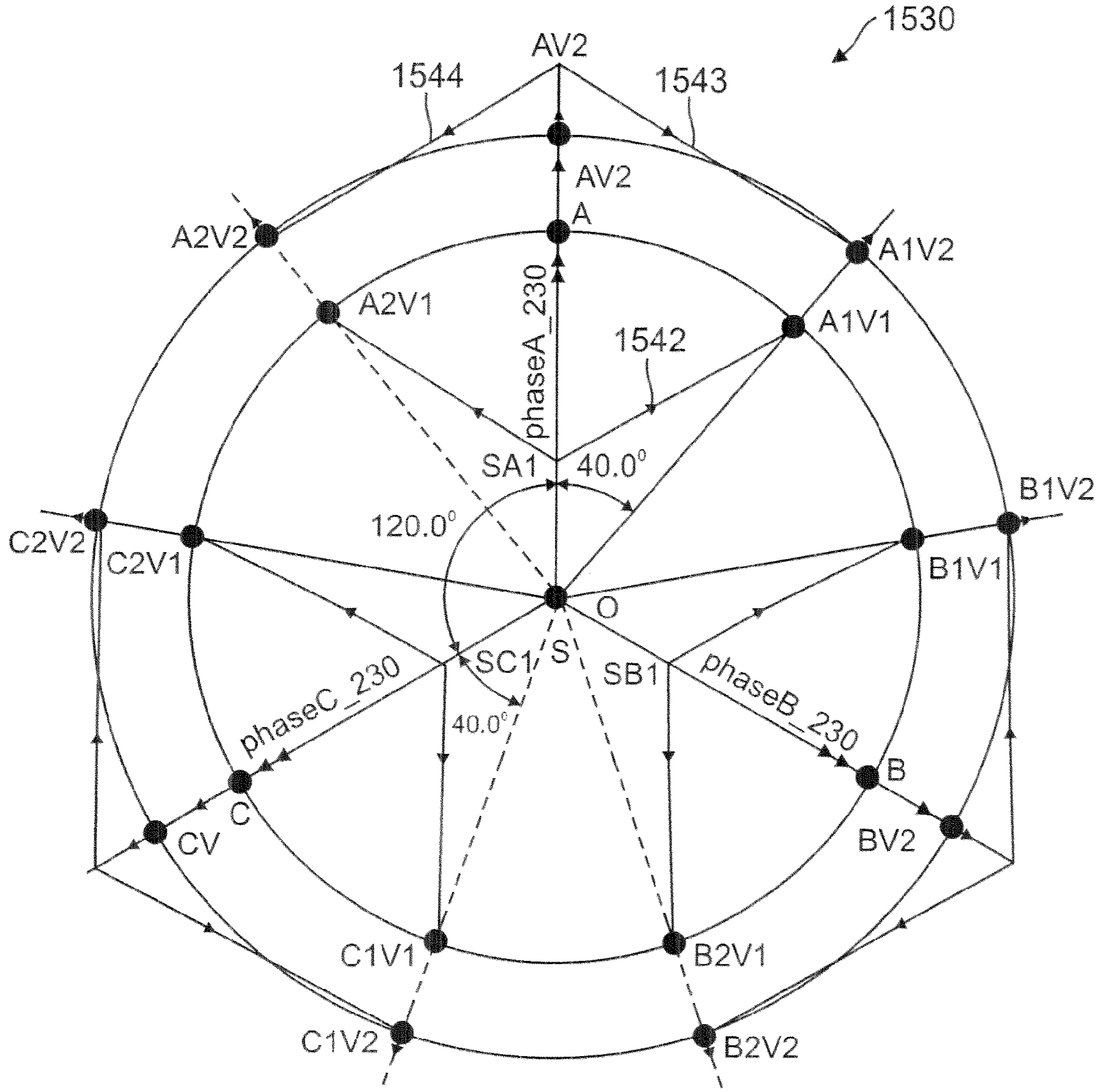
FIG. 15B is a phasor diagram for the multi-phase auto-transformer of FIG. 15A.

Another embodiment of a multi-phase transformer is now described with respect to FIGS. 15A and 15B. Transformer 1500 is an example of a nine phase or eighteen pulse multi-phase transformer. The multi-phase transformer 1500 is similar to the multi-phase transformer 1000 described above with respect to FIGS. 10A and 10B.

One of the differences between transformer 1000 and transformer 1500 is that the transformer 1500 may be constructed with secondary windings without sub-windings. Another difference is that some of the third windings in transformer 1000 may include a plurality of sub-windings and more than one second end.

Similarity in the construction of the transformer 1500 with respect to transformer 1000 may be understood by referring to FIGS. 15A and 15B and description of transformer 1000 provided herein above. Some of the similarities and differences are described below.

Transformer 1500 may include a plurality of primary windings 108A-108C, with a first end of each primary winding coupled together to form a common junction CJ and a second end 114A-114C respectively. Each of the primary windings may include a plurality of sub primary windings that are coupled in series at one or more interior junctions. For example, primary winding 108A may include sub primary windings 108A1 and 108A2, coupled in series at interior junction 112A1. Primary windings 108B and 108C are similarly constructed.

Transformer 1400 includes a plurality of secondary windings 116A1-116A2, 116B1-116B2, 116C1-116C2. Each secondary winding 116A1-116C2 may be magnetically coupled to one of the primary windings 108A-108C.

In one embodiment, the first end 118 of the secondary windings may be coupled to the interior junction of a primary winding. For example, first end 118 of secondary winding 116A1 may be coupled to the interior junction 112A1.

The transformer 1400 includes a plurality of third windings 122A1-122A2; 122B1-122B2; and 122C1-122C2. Third windings may have a first end 124 and at least one second end 126. Some of the third windings include a plurality of secondary windings and more than one second end. For example, third windings 122A2, 122B2 and 122C2.

Third winding will now be described in detail with respect to third winding 122A2.

Third winding 12A2 may include a first sub-winding 122A21 and a plurality of second sub-windings 122A22 and 122A23. One end of the first sub-winding 122A21, second sub-winding 122A22 and second sub-winding 122A23 are coupled together to define a sub-junction 124'. The other end of first sub-winding 122A21 corresponds to the first end 124 of Third winding 122A2. The other end of second sub-winding 122A22 corresponds to a second end 126 of secondary winding 122A2. The other end of second sub-winding 122A23 corresponds to another second end 126 of secondary winding 122A2.

Each Third winding 122A1-122C2 may be magnetically coupled to one of the primary windings 108A-108C. In one embodiment, sub-windings of a third winding may be magnetically coupled to different primary windings.

In one embodiment, the first end of the third windings is coupled to one of the second end of a primary winding or to a second end of another third winding. For example, the first end 124 of third winding 122A1 may be coupled to the second end 114A of primary winding 108A. The first end 124 of third winding 122A2 may be coupled to the second end 126 of third winding 122A1.

The phasor diagram 1530 (FIG. 15B) of transformer 1500 may be understood based upon the teachings of other phasor diagrams disclosed herein, for example, phasor diagram 1000 described above with respect to FIG. 10B. For example, point A1V1 in phasor diagram 1530 represents the second end 120 of secondary winding 116A1. Similarly, point AV2' in phasor diagram 1530 represents the sub-junction 124' of third winding 122A2.

However, as one skilled in the art appreciates, in the phasor diagram 1530, the vector of the induced voltage in some of the secondary windings and third windings and sub-windings may be different than the vector of the induced voltage shown with respect to phasor diagram 1000. For example, the line SA1-S1V1 represents the secondary winding 116A1 and the arrow 1542 represents the vector of the induced voltage in the secondary winding 116A1. Similarly, with respect to the third winding 122A2, the first sub-winding is represented by line AV2-AV2', the second sub-winding 122A22 is represented by line AV2'-A1V2 and the second sub-winding 116A13 as represented by line AV2'-A2V2. For example, the arrow 1443 on line AV2'-A1V2 and arrow 1544 on line AV2'-A2V2 each represent the vector of the induced voltage in the second sub-winding 122A22 and second sub-winding 122A23 of third winding 122A2 respectively.

In one embodiment, a vector of the induced voltage in the primary windings and the secondary windings is such that the phase angle difference of the output voltage at two adjacent second ends of the primary windings and the secondary windings is substantially the same.

In one embodiment, a vector of the induced voltage in the third windings is such that the phase angle difference of the output voltage at two adjacent second ends of the third windings is substantially the same.

The phasor diagram 1530 shows an example of a vector of the induced voltage in the primary windings, secondary windings and the third windings.

As one skilled in the art appreciates, various embodiments of multi-phase transformers have been described. Using various variations of the first group of windings, second group of windings and third group of windings, multi-phase transformers providing different number of phases or pulses may be configured.

The number of turns for windings shown in each of the winding diagrams is exemplary for the multi-phase transformer described with respect to that winding diagram. For example, number of turns N1 described with respect to transformer 100 of FIG. 1A may not be equal to the number of turns N1 described with respect to transformer 1500 of FIG. 15A.

Although exemplary vector of the induced voltage in the primary windings, secondary windings and third windings have been shown with respect to various phasor diagrams, as one skilled in the art appreciates, modifications may be made to magnetic coupling configurations.

In one embodiment, with respect to six phase or twelve pulse transformers, a phase angle difference of the output voltage at two adjacent second ends of third windings are about 60 degrees. In one embodiment, a phase angle difference of the output voltage at two adjacent second ends of the primary windings and the secondary windings are about 60 degrees.

In one embodiment, with respect to nine phase or eighteen pulse transformers, a phase angle difference of the output voltage at two adjacent second ends of third windings are about 40 degrees. In one embodiment, a phase angle difference of the output voltage at two adjacent second ends of the primary windings and the secondary windings are about 40 degrees.

In one embodiment, with respect to twelve phase or twenty four pulse transformers, a phase angle difference of the output voltage at two adjacent second ends of third windings are about 30 degrees. In one embodiment, a phase angle difference of the output voltage at two adjacent second ends of the primary windings and the secondary windings are about 30 degrees.

In one embodiment, with respect to fifteen phase or thirty pulse transformers, a phase angle difference of the output voltage at two adjacent second ends of third windings are about 24 degrees. In one embodiment, a phase angle difference of the output voltage at two adjacent second ends of the primary windings and the secondary windings are about 24 degrees.

Although the present disclosure has been described with respect to specific embodiments, these embodiments are illustrative only and not limiting. Many other applications and embodiments of the present disclosure will be apparent in light of this disclosure and the following claims.

What is claimed is:

1. A multi-phase transformer, comprising:

a first group of windings having a plurality of primary windings and each primary winding having a first end and a second end;

wherein the first end of each of the primary windings is coupled at a common junction to form a wye configuration; and wherein each of the primary winding is configured to receive a phase of a multi-phase input voltage at the second end of each of the primary windings;

a second group of windings having a plurality of secondary windings and each secondary winding has a first end and a second end;

wherein each secondary winding is magnetically coupled to a primary winding; and a third group of windings having a plurality of third windings and each third winding has a first end and a second end;

wherein each third winding is magnetically coupled to a primary winding from among the plurality of primary windings such that an output voltage at the second end of the third windings is higher than an output voltage at the second end of the secondary windings and the second end of the primary windings.

2. The transformer of claim 1, wherein a phase angle difference of the output voltage at two adjacent second ends of the third windings are substantially the same.

3. The transformer of claim 2, wherein the output voltage at the second end of the third windings are substantially equal and the output voltage at the second end of the secondary windings and the second end of the primary windings are substantially equal.

4. The transformer of claim 1, wherein a plurality of second end of the third windings are configured to couple to a rectifier circuit to rectify the output voltage at the second end of the third windings and output a rectified second voltage.

5. The transformer of claim 4, wherein the rectified second voltage is greater than a rectified output voltage derived from rectifying the input voltage.

6. The transformer of claim 4, wherein the second end of the primary windings and the secondary windings are configured to couple to a rectifier circuit to rectify an output at the second end of the primary windings and the secondary windings, and output a rectified first voltage that is less than the rectified second voltage.

7. The transformer of claim 6, wherein the rectified first voltage is substantially equal to a rectified output voltage derived from rectifying the input voltage.

8. The transformer of claim 2, wherein the phase difference is 60 degrees.

9. The transformer of claim 1, wherein the the first end of each of the secondary winding is coupled to the common junction of the primary windings; and the first end of each of the third winding is coupled to a second end of a secondary winding from among the plurality of secondary windings.

10. The transformer of claim 9, wherein the third windings includes a first sub-winding with two ends and a second sub-winding with two ends; wherein the first sub-winding and the second sub-winding is connected in series at one end; wherein the other end of the first sub-winding corresponds to the first end of the third winding; wherein the other end of the second sub-winding corresponds to the second end of the third winding; and a vector of the induced voltage in the first sub-winding is different than a second sub-winding such that a phase angle difference of the output voltage at two adjacent second ends of the third windings are substantially the same.

11. The transformer of claim 9, wherein a vector of the induced voltage in the third windings is such that a phase angle difference of the output voltage at two adjacent second ends of the third windings are substantially the same.

12. The transformer of claim 11, wherein a vector of the induced voltage in the primary windings and the secondary windings is such that a phase angle of the output voltage at the second end of the third winding is different than a phase angle of the output at the second end of the primary winding or the secondary winding to which the first end of the third winding is coupled to.

13. The transformer of claim 1, wherein all the secondary windings include a first sub-winding with two ends wherein one end of first sub-winding corresponds to the first end of the secondary winding; and a plurality of second sub-windings with two ends; another end of the first sub-winding and one end of some of the second sub-windings are coupled together;

wherein the other end of each of the second sub-windings coupled to the first sub-winding is coupled to one end of at least one other second sub-winding at sub-junctions, wherein the other ends of the other sub-windings correspond to a plurality of second ends of the secondary winding;

the first end of each of the third winding is coupled to either a second end of one of the primary windings or a sub-junction of one of the secondary windings; and the first end of each of the secondary winding is coupled to the second end of the third windings.

14. The transformer of claim 12, wherein a vector of the induced voltage in the third windings is such that a phase angle difference of the output voltage at two adjacent second ends of the third windings are substantially the same.

15. The transformer of claim 12, wherein a vector of the induced voltage in the secondary windings is such that a phase angle difference of an output voltage at two adjacent second ends of the second windings are substantially the same.

16. A multi-phase transformer, comprising:

a first group of windings having a plurality of primary windings and each primary winding having a first end and a second end;

wherein the first end of each of the primary windings is coupled at a common junction to form a wye configuration;

wherein each of the primary windings includes one or more sub primary windings coupled in series, and a junction of two sub primary winding define an interior junction; and wherein each of the primary windings is configured to receive a phase of a multi-phase input voltage at the second end of each of the primary windings;

a second group of windings having a plurality of secondary windings and each secondary winding has a first end and a second end;

wherein each secondary winding is magnetically coupled to a primary winding; and a third group of windings having a plurality of third windings and each third winding has a first end and a second end;

wherein each third winding is magnetically coupled to a primary winding from among the plurality of primary windings such that an output voltage at the second end of the third windings is higher than an output voltage at the second end of the secondary windings and the second end of the primary windings.

17. The transformer of claim 16, wherein a vector of the induced voltage in the third windings is such that the phase angle difference of the output voltage at two adjacent second ends of the third windings are substantially the same.

18. The transformer of claim 16, wherein a vector of the induced voltage in the secondary windings is such that the phase angle difference of the output voltage at two adjacent second ends of the second windings are substantially the same.

19. The transformer of claim 16, wherein the first end of each of the secondary winding is coupled to either the common junction of the primary windings or to the sub junction of one of the primary windings; and wherein the first end of each of the third winding is coupled to the second end of one of the primary windings, second end of one of the secondary winding or the sub junction of one or the primary winding.

20. The transformer of claim 19, wherein a vector of the induced voltage in the third windings is such that the phase angle difference of the output voltage at two adjacent second ends of the third windings are substantially the same.

21. The transformer of claim 16, wherein some of the third windings include a first sub-winding with two ends and a second sub-winding with two ends;

wherein the first sub-winding and the second sub-winding is connected in series at one end and form a sub-junction;

wherein the other end of the first sub-winding corresponds to the first end of the third winding; and wherein the other end of the second sub-winding corresponds to the second end of the third winding;

wherein the first end of each of the secondary winding is coupled to either the sub junction of one of the primary windings or the sub-junction of one of the third windings; and wherein the first end of each of the third winding is coupled to either the second end of one of the primary windings or the sub junction of one of the primary windings.

22. The transformer of claim 21, wherein a vector of the induced voltage in the third windings is such that the phase angle difference of the output voltage at two adjacent second ends of the third windings are substantially the same.

23. The transformer of claim 21, wherein a vector of the induced voltage in the secondary windings is such that the phase angle difference of the output voltage at two adjacent second ends of the second windings are substantially the same.

24. The transformer of claim 16, wherein some of the secondary windings include a first sub-winding with two ends and a second sub-winding with two ends;

wherein the first sub-winding and the second sub-winding are connected in series at one end to form a sub-junction;

wherein the other end of the first sub-winding corresponds to the first end of the secondary winding; and wherein the other end of the second sub-winding corresponds to the second end of the secondary winding;

wherein the first end of each of the secondary winding is coupled either to the sub junction of one of the primary windings or to the common junction; and wherein the first end of each of the third winding is coupled to either the second end of one of the primary windings or to the sub junction of one of the secondary windings.

25. The transformer of claim 24, wherein a vector of the induced voltage in the third windings is such that the phase angle difference of the output voltage at two adjacent second ends of the third windings are substantially the same.

26. The transformer of claim 24, wherein a vector of the induced voltage in the secondary windings is such that the phase angle difference of the output voltage at two adjacent second ends of the second windings are substantially the same.

27. The transformer of claim 16, wherein all of the secondary windings include a first sub-winding with two ends and a second sub-winding with two ends;

wherein the first sub-winding and the second sub-winding are connected in series at one end to form a sub-junction;

wherein the other end of the first sub-winding corresponds to the first end of the secondary winding; and wherein the other end of the second sub-winding corresponds to the second end of the secondary winding;

wherein the first end of each of the secondary winding is coupled to the sub junction of one of the primary windings; and wherein the first end of each of the third winding is coupled either to the second end of one of the primary windings or to the sub-junction of one of the secondary windings.

28. The transformer of claim 27, wherein a vector of the induced voltage in the third windings is such that the phase angle difference of the output voltage at two adjacent second ends of the third windings are substantially the same.

29. The transformer of claim 27, wherein a vector of the induced voltage in the secondary windings is such that the phase angle difference of the output voltage at two adjacent second ends of the second windings are substantially the same.

30. The transformer of claim 16, wherein all of the secondary windings include a first sub-winding with two ends wherein one end corresponds to the first end of the secondary winding and a plurality of second sub-windings with two ends;

wherein the other end of the first sub-winding is coupled to one end of the second sub-winding;

wherein the other end of the second sub-winding is coupled to one end of another second sub-winding to form a sub-junction; and wherein the other end of the another second sub-winding corresponds to the second end of the secondary winding;

wherein the first end of each of the secondary winding is coupled to the second end of one of the primary windings; and wherein the first end of each of the third winding is coupled either to the second end of one of the primary windings or to the sub junction of one of the secondary windings.

31. The transformer of claim 30, wherein a vector of the induced voltage in the third windings is such that the phase angle difference of the output voltage at two adjacent second ends of the third windings are substantially the same.

32. The transformer of claim 30, wherein a vector of the induced voltage in the secondary windings is such that the phase angle difference of the output voltage at two adjacent second ends of the second windings are substantially the same.

33. The transformer of claim 16, wherein each of the secondary winding has a plurality of second ends;

wherein all of the secondary windings include a first sub-winding with two ends wherein one end corresponds to the first end of the secondary winding and a plurality of second sub-winding with two ends;

wherein the other end of the first sub-winding and one end of all of the second sub-windings are connected together; and wherein the other ends of the second sub-windings corresponds to the plurality of second ends of the secondary winding;

wherein the first end of each of the secondary winding is coupled to the common junction of the primary windings; and wherein the first end of each of the third winding is coupled either to the second end of one of the primary windings or to one of the second ends of one of the secondary windings.

34. The transformer of claim 33, wherein a vector of the induced voltage in the third windings is such that the phase angle difference of the output voltage at two adjacent second ends of the third windings are substantially the same.

35. The transformer of claim 33, wherein s vector of the induced voltage in the secondary windings is such that the phase angle difference of the output voltage at two adjacent second ends of the second windings are substantially the same.

36. The transformer of claim 16, wherein each of the secondary winding has a plurality of second ends;

all of the secondary windings include a first sub-winding with two ends wherein one end corresponds to the first end of the secondary winding and a plurality of second sub-windings with two ends;

wherein the other end of the first sub-winding and one end of some of the second sub-windings are coupled together;

wherein the other ends of each of the second sub-windings that are coupled to the first sub-winding are each coupled to one end of at least one additional second sub-winding to form a sub-junctions; and wherein the other ends of the additional sub-windings correspond to the plurality of second ends of the secondary winding;

wherein the first end of each of the secondary winding is coupled to the interior junction of one of the primary windings; and wherein the first end of each of the third winding is coupled either to the second end of one of the primary windings or to the sub-junction of one of the secondary windings.

37. The transformer of claim 36, wherein a vector of the induced voltage in the third windings is such that the phase angle difference of the output voltage at two adjacent second ends of the third windings are substantially the same.

38. The transformer of claim 36, wherein a vector of the induced voltage in the secondary windings is such that the phase angle difference of an output voltage at two adjacent second ends of the second windings are substantially the same.

39. The transformer of claim 16, wherein some of the third windings include a plurality of second ends;

wherein some of the third windings include a first sub-winding with two ends wherein one end corresponds to the first end of the third winding and a plurality of second sub-windings with two ends;

wherein the other end of the first sub-winding and one end of the plurality of second sub-windings are coupled together; and wherein the other ends of each of the second sub-windings correspond to the plurality of second ends of the third windings;

wherein the first end of each of the secondary winding is coupled to the interior junction of one of the primary windings;

wherein the first end of each of the third winding without the plurality of second ends is coupled to the second end of one of the primary windings; and wherein the first end of each of the third winding with the plurality of second ends is coupled to the second ends of the third windings without the plurality of second ends.

40. The transformer of claim 39, wherein a vector of the induced voltage in the third windings is such that the phase angle difference of the output voltage at two adjacent second ends of the third windings are substantially the same.

41. The transformer of claim 39, wherein a vector of the induced voltage in the secondary windings is such that the phase angle difference of an output voltage at two adjacent second ends of the second windings are substantially the same.

* * * * *